US011520362B2

United States Patent
Dasgupta et al.

(10) Patent No.: US 11,520,362 B2
(45) Date of Patent: Dec. 6, 2022

(54) CONTROL FOR A TARGET COMMON BUS VOLTAGE

(71) Applicants: Rolls-Royce Singapore Pte. Ltd., Singapore (SG); Rolls-Royce Corporation, Indianapolis, IN (US)

(72) Inventors: Souvik Dasgupta, Singapore (SG); Gabriel Ooi, Singapore (SG); Chandana Jayampathi Gajanayake, Singapore (SG); Suvajit Mukherjee, Singapore (SG); Michael P. Dougherty, Indianapolis, IN (US); Stephen Andrew Long, Carmel, IN (US)

(73) Assignees: Rolls-Royce Singapore Pte. Ltd., Singapore (SG); Rolls-Royce Corporation, Indianapolis, IN (US)

( * ) Notice: Subject to any disclaimer, the term of this patent is extended or adjusted under 35 U.S.C. 154(b) by 0 days.

(21) Appl. No.: 17/177,693

(22) Filed: Feb. 17, 2021

(65) Prior Publication Data
US 2022/0261023 A1 Aug. 18, 2022

(51) Int. Cl.
*G05F 1/46* (2006.01)
*H02J 7/00* (2006.01)
(Continued)

(52) U.S. Cl.
CPC .............. *G05F 1/46* (2013.01); *B64D 31/00* (2013.01); *B64D 41/00* (2013.01); *H02J 3/32* (2013.01);
(Continued)

(58) Field of Classification Search
CPC ... G06F 1/263; H02J 3/32; H02J 3/381; H02J 3/383; H02J 7/34; H02J 7/345; H02J 7/35;
(Continued)

(56) References Cited

U.S. PATENT DOCUMENTS 10,097,095 B2  10/2018  Vijayan et al.
10,549,648 B2  2/2020  King et al.
(Continued)

FOREIGN PATENT DOCUMENTS

CN  108701996 A  10/2018
FR  3079819 A1  10/2019

OTHER PUBLICATIONS

Zhao, Yaomin, et al. "Control strategy of automatic charging/discharging of hybrid energy storage systems in DC micro-grid island mode." 2015 IEEE 10th Conference on Industrial Electronics and Applications (ICIEA). IEEE, 2015. (Year: 2015).*

(Continued)

*Primary Examiner* — Ryan Johnson
(74) *Attorney, Agent, or Firm* — Shumaker & Sieffert, P.A.

(57) ABSTRACT

In some examples, a system includes an energy storage device configured to deliver power to a bus or receive power from a bus via a power converter. The system also includes a controller configured to determine that a voltage magnitude on the bus is less than a first threshold level in a first instance and cause the energy storage device to deliver power to the bus in response to determining that the voltage magnitude is less than the first threshold level. The controller is also configured to determine that the voltage magnitude on the bus is greater than a second threshold level in the second instance, wherein the second threshold level is greater than a first threshold level and cause the energy storage device to receive power from the bus in response to determining that the voltage magnitude is greater than the second threshold level.

20 Claims, 15 Drawing Sheets

(51) Int. Cl.
*B64D 31/00* (2006.01)
*B64D 41/00* (2006.01)
*H02J 3/32* (2006.01)

(52) U.S. Cl.
CPC ........ *H02J 7/0068* (2013.01); *B64D 2221/00* (2013.01); *H02J 2207/20* (2020.01); *H02J 2310/44* (2020.01)

(58) Field of Classification Search
CPC .......... H02J 1/10; H02J 1/102; H02J 2207/20; H02J 2300/20; H02J 2300/24; H02J 2300/40; H02J 2310/44; B64D 2221/00; B64D 31/00; B64D 41/00; G05F 1/46
See application file for complete search history.

(56) References Cited

U.S. PATENT DOCUMENTS

| | | | |
|---|---|---|---|
| 10,633,104 B2 | 4/2020 | Miller et al. | |
| 10,676,198 B2 | 6/2020 | Klemen et al. | |
| 10,693,367 B1 | 6/2020 | Chatterjee et al. | |
| 11,050,257 B2 | 6/2021 | Hui et al. | |
| 2011/0273022 A1* | 11/2011 | Dennis | H02J 1/10 307/72 |
| 2015/0045978 A1 | 2/2015 | Yoshiguchi et al. | |
| 2015/0123463 A1 | 5/2015 | Huang et al. | |
| 2015/0145326 A1 | 5/2015 | Scheffler et al. | |
| 2016/0107758 A1 | 4/2016 | Esteyne et al. | |
| 2016/0236790 A1 | 8/2016 | Knapp et al. | |
| 2018/0362181 A1* | 12/2018 | Iwashima | H02M 3/00 |

OTHER PUBLICATIONS

U.S. Appl. No. 17/177,664, filed Feb. 17, 2021, by Dasgupta et al.
U.S. Appl. No. 17/177,721, filed Feb. 17, 2021, by Dasgupta et al.
U.S. Appl. No. 17/230,410, filed Apr. 14, 2021, by Dougherty.
Gao et al., "Coordinated Control of a DC Electrical Power System in the More Electric Aircraft Integrated with Energy Storage", IEEE 2015, 8 pgs.
Gao et al., "Analysis of Droop Control Methods in DC Microgrid", Aug. 2014, 9 pgs.
Gao et al., "Stability of Multi-Source Droop-Controlled Electrical Power System for More-Electric Aircraft", IEEE 2014, 5 pgs.
Gao et al., "Control Design and Voltage Stability Analysis of a Droop-Controlled Electrical Power System for More Electric Aircraft", IEEE Dec. 2017, 11 pgs.
Barzkar et al., "Electric Power Systems in More and All Electric Aircraft: A Review", IEEE Sep. 2020, 19 pgs.
Datta et al., "Battery Energy Storage System for Aggregated Inertia-Droop Control and a Novel Frequency Dependent State-of-Charge Recovery", Apr. 2020, 18 pgs.
Gao et al., "Comparative Stability Analysis of Droop Control Approaches in Voltage-Source-Converter-Based DC Microgrids", Jun. 2017, 32 pgs.
Pragallapati et al., "Secondary Voltage and Droop Control Strategy of Parallel Converters based Cell-Level Battery Applications", IEEE 2009, 5 pgs.
Zheng et al., "A Droop Control Based Three Phase Bidirectional AC-DC Converter for More Electric Aircraft Applications", Mar. 2017, 17 pgs.
U.S. Appl. No. 16/951,269, filed Nov. 18, 2020 by Yang et al.
U.S. Appl. No. 17/100,225, filed Nov. 20, 2020 by Gajanayake et al.
Office Action from U.S. Appl. No. 17/177,664, dated Mar. 16, 2022, 14 pp.
Wikipedia, "Microturbine", Dec. 2019, retrieved from https://en.wikipedia.org/w/index.php?title=Microturbine&oldid=930268320 on Mar. 11, 2022 (Year: 2019).
Office Action from U.S. Appl. No. 17/177,721, dated Jan. 19, 2022, 13 pp.
Final Office Action from U.S. Appl. No. 17/177,664 dated Jul. 13, 2022, 8 pp.
Final Office Action from U.S. Appl. No. 17/177,721, dated May 26, 2022, 10 pp.
Response to Office Action dated Apr. 19, 2022, from U.S. Appl. No. 17/177,721, filed Apr. 19, 2022, 10 pp.
Response to Office Action dated Mar. 16, 2022, from U.S. Appl. No. 17/177,664, filed Jun. 15, 2022, 10 pp.
Notice of Allowance from U.S. Appl. No. 17/177,664 dated Aug. 5, 2022, 7 pp.
Notice of Allowance from U.S. Appl. No. 17/177,721 dated Aug. 8, 2022, 7 pp.
Response to Final Office Action dated Jul. 13, 2022 from U.S. Appl. No. 17/177,664, filed Jul. 26, 2022, 10 pp.
Response to Final Office Action dated May 26, 2022 from U.S. Appl. No. 17/177,721, filed Jul. 26, 2022, 9 pp.

* cited by examiner

CONTROL FOR A TARGET COMMON BUS VOLTAGE

TECHNICAL FIELD

This disclosure relates to electrical power systems.

BACKGROUND

A bus bar in an electrical power system can deliver power from a power source to a load that is remote form the power source. A first power converter can supply power generated by the power source to the bus bar, and a second power converter can deliver power from the bus bar to the load. An energy storage device can act as a load or as a power source by supplying or consuming power, depending on the circumstances. One example is an electrical power system onboard an aircraft that includes a generator configured to convert mechanical energy of an engine into electrical energy for distribution on a bus bar to a remote propulsor. The aircraft can include a motor that drives the propulsor based on power received from the bus bar. In this way, the engine can drive the remote propulsor and provide power to other loads onboard the aircraft.

SUMMARY

This disclosure describes techniques for controlling energy resources that are connected to a bus in an electrical power system. The energy resources may include a power source, an energy storage device, and a load. A system controller may be configured to send commands to a first primary controller that is configured to control the power source, to a second primary controller that is configured to control the energy storage device, and/or to a third primary controller that is configured to control the load.

The techniques of this disclosure may allow for management of all of the energy resources connected to the bus. Each primary controller may be configured to implement a droop power curve based on locally sensed parameters, which may allow for the primary controllers to quickly respond to disturbances on the bus. The primary controllers may be able to effectively maintain the voltage magnitude on the bus with relatively small transients regardless of the operating modes of the power sources, energy storage devices, and loads.

In some examples, a system includes an energy storage device configured to deliver power to a bus or receive power from a bus via a power converter. The system also includes a controller configured to determine that a voltage magnitude on the bus is less than a first threshold level in a first instance and cause the energy storage device to deliver power to the bus in response to determining that the voltage magnitude on the bus is less than the first threshold level. The controller is also configured to determine that the voltage magnitude on the bus is greater than a second threshold level in the second instance, wherein the second threshold level is greater than a first threshold level and cause the energy storage device to receive power from the bus in response to determining that the voltage magnitude on the bus is greater than the second threshold level.

In some examples, a method includes determining, by a storage controller, that a voltage magnitude on a bus is less than a first threshold level in a first instance. The method also includes causing, by the storage controller, an energy storage device to deliver power to the bus in response to determining that the voltage magnitude on the bus is less than the first threshold level. The method further includes determining, by the storage controller, that the voltage magnitude on the bus is greater than a second threshold level in a second instance, wherein the second threshold level is greater than the first threshold level. The method includes causing, by the storage controller, the energy storage device to receive power from the bus in response to determining that the voltage magnitude on the bus is greater than the second threshold level.

In some examples, a device includes a computer-readable medium having executable instructions stored thereon, configured to be executable by processing circuitry for causing the processing circuitry to determine that a voltage magnitude on a bus is less than a first threshold level in a first instance. The instructions are configured to be executable by the processing circuitry for also causing the processing circuitry to cause an energy storage device to deliver power to the bus in response to determining that the voltage magnitude on the bus is less than the first threshold level. The instructions are configured to be executable by the processing circuitry for further causing the processing circuitry to determine that the voltage magnitude on the bus is greater than a second threshold level in a second instance, wherein the second threshold level is greater than the first threshold level. The instructions are configured to be executable by the processing circuitry for causing the processing circuitry to cause the energy storage device to receive power from the bus in response to determining that the voltage magnitude on the bus is greater than the second threshold level.

The details of one or more examples are set forth in the accompanying drawings and the description below. Other features, objects, and advantages will be apparent from the description and drawings, and from the claims.

DETAILED DESCRIPTION

Figure 1:
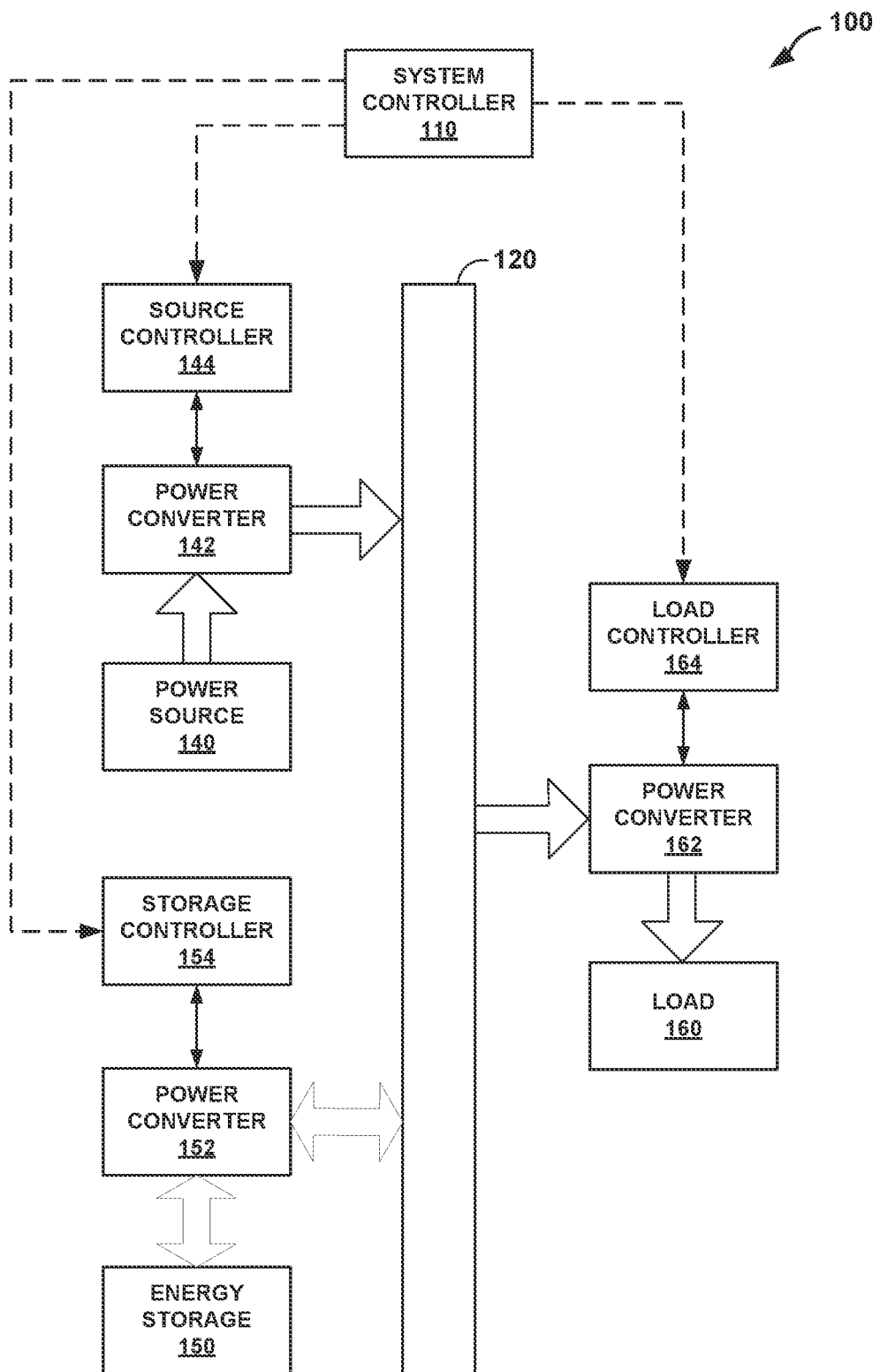
FIG. 1 is a conceptual block diagram illustrating a system including three different types of energy resources connected to a bus, in accordance with one or more techniques of this disclosure.

This disclosure describes techniques for controlling distributed energy resources (e.g., sources, loads, and storage devices) that are connected to an electrical bus for transferring power from one or more sources to one or more loads. In addition, one or more energy storage devices may be connected to the bus, where each energy storage device can act as a source or a load. Each energy resource in the system may be connected to the bus via a power converter, and the system may include a plurality of individual controllers, also referred to as primary controllers. Each individual controller is configured to control a respective power converter in a droop control mode, where the individual controller can control a respective power converter based on one or more parameters (e.g., a sensed signal and/or a set point) without direct control from the a centralized controller. A controller operating in droop control mode may operate on its own without communicating with any other controller, except for receiving commands from a system controller to set threshold levels.

In some examples, each of the energy resources are connected to the bus via a respective power converter, where each power converter has a particular topology. For example, a power source may be connected to the bus via a rectifier that converts alternating current (AC) electricity produced by the power source to direct current (DC) electricity for delivery to the bus. A load may be connected to the bus via an inverter that converts DC from the bus to AC for use by the load (e.g., to drive the load). An energy storage device may be connected to the bus via a DC/DC converter that converts the DC voltage across the terminals of the storage device to the DC voltage on the bus. A system controller may be configured to send a set point command to each of the converters, where converters may have a different topology (e.g., rectifier(s), inverter(s), and/or DC/DC converters). Each of the controllers and power converters are integrated into the system and operate together despite the differing topologies and types.

The distributed controllers may be capable of coordinated mode transitions, such as a transition to a high-propulsion mode where one or more of the propulsors consume more power than during normal operation. During a high-propulsion mode, the power sources generate power and the energy storage devices operate in discharge mode to deliver electricity to the loads. Another example transition is to a charging mode where the energy storage devices receive power generated by the power sources. These transitions can be performed by the primary controllers implementing droop curves, in some cases without coordination between the primary controllers and/or without direction from a system controller. The energy resource power flow transitions are maintained by the commands sent by the system controller to each of the primary controllers. The transitions between operating modes may be relatively easy because of the autonomy of the primary controllers.

The primary controllers may be designed to react quickly to mode transitions because of the autonomy of the primary controllers. The system may be able to smoothly transition from one mode to another mode without changing any of the control loops in any of the controllers or energy resources. Quick action by the local, autonomous controllers may result in a well-maintained bus voltage that is kept within certain limits, which may be especially useful for aerospace applications in which stable propulsion without substantial deviations is desirable. Thus, because of this stable, well-maintained bus voltage, the system may be designed with fewer and/or smaller capacitors, which can lower the size, weight, cost, and complexity of the system, as compared to an existing system.

Each energy storage device may be connected to the bus via a respective power converter that is controlled by a storage controller. The storage controller may be configured to operate the power converter with a voltage deadband, which may reduce the fatigue experienced by the energy storage device that can result from excessive charge and discharge cycles. The storage controller may be configured to set the thresholds for the voltage deadband based on commands received from a system controller.

Each load may be connected to the bus via a respective power converter and a respective motor that are controlled by a load controller. The load controller may be configured to operate the power converter and load with a modified voltage deadband, whereby the controller may reduce the power drawn from the bus by the load when the bus voltage drops below a threshold level. The modified deadband may allow for reduction of the power drawn by the load when the voltage magnitude on bus 120 deviates downward.

FIG. 1 is a conceptual block diagram illustrating a system 100 including three different types of energy resources 140, 150, and 160 connected to a bus 120, in accordance with one or more techniques of this disclosure. Although FIG. 1 depicts three energy resources (e.g., a single power source 140, a single energy storage device 150, and a single load 160), system 100 may include one or more power sources 140, one or more energy storage devices 150, and/or one or more loads 160. Power source 140 may be referred to as energy resource 140, energy storage device 150 may be referred to as energy resource 150, and load 160 may be referred to as energy resource 160. For example, power source 140 may represent two or more generators, energy storage device 150 may represent two or more batteries, load 160 may represent two or more propulsors. In addition, system 100 may also include different types of power sources, different types of energy storage devices, and/or different types of loads 160. In other words, there may be any number and any type of sources, storage devices, and loads in system 100. Two or more components can share a single power converter, or each component may have a dedicated power converter.

In some examples, system 100 is a hybrid electric propulsion system including multiple generation systems, energy storage devices, and loads in an aerospace application. The control coordination among all of the primary controllers 144, 154, and 164 in various operating modes is an important concern for a successful and effective hybrid electric propulsion solution in aerospace applications. To accomplish this control coordination and maintain a desired bus voltage, system controller 110 may be configured to establish and transmit set points to the primary controllers 144, 154, and 164, as described in further detail below.

Bus 120 may include a DC bus and/or an AC bus, such as a high-voltage DC bus. In some examples, bus 120 includes a differential bus with a high-side rail and a low-side rail. Additionally or alternatively, bus 120 may include a ground rail, which may be connected to a chassis, frame, or housing of system 100. Bus 120 may carry a voltage potential of one hundred volts, 270 volts, 540 volts, 1080 volts, and/or any other voltage level. The voltage magnitude on bus 120 may increase as power source 140 generates more power, and the voltage magnitude on bus 120 may decrease as load 160 consumes more power.

Power source 140 may include a gas turbine engine driving, for example, two generators. The two generators may have a common central shaft with two different electromagnetic generators within the housing that are positioned around and coaxial with the shaft. In some examples, power source 140 includes two generators with side-by-side stators that may be enclosed in the same housing. Each generator may be connected to common bus 120 via an individual AC/DC converter. In addition, energy storage device 150 is connected to the same common DC bus 120 via DC/DC converter. Power source 140 may include a wound field machine, a Halbach array generator with permanent magnets on a rotor that is driven by an engine shaft or a propulsor shaft, or any other type of generator.

Energy storage device 150 is connected to bus 120 via power converter 152. Power converter 152 may include a DC/DC converter for boosting the voltage across the terminals of energy storage device 150 to the voltage magnitude on bus 120 and/or stepping down the voltage magnitude on bus 120 to the voltage across the terminals of energy storage device 150. For example, the desired voltage magnitude on bus 120 may be 1,080 volts, and the voltage across the terminals of energy storage device 150 may be approximately eight or nine hundred volts.

Load 160 may include any component that receives power from bus 120. Common bus 120 delivers power to load 160, and load 160 may represent two or more motors, each configured to drive a propulsor. Each motor may include a gearbox to interface with the propulsor. Each motor may be driven by AC electricity received from power converter 162, or each motor may be driven by AC electricity received from a separate, dedicated power converter. Load 160 may be configured to operate at multiple different power levels, where load controller 164 can control power converter 162 to achieve a desired power level for load 160.

Each of power converters 142, 152, and 162 are controlled by a respective primary controller. Additional example details of power converters in an electrical power system are described in commonly assigned U.S. Pat. No. 10,693,367, entitled "Pre-Charging Circuit for Power Converters," issued on Jun. 23, 2020; U.S. patent application Ser. No. 16/951,269, entitled "Fault Detection for a Solid State Power Converter," filed on Nov. 18, 2020; and U.S. patent application Ser. No. 17/100,225, entitled "Fault Detection for a Solid State Power Converter," filed on Nov. 20, 2020, the entire contents of which are incorporated herein by reference.

Each of controllers 144, 154, and 164 may be configured to receive a sensed signal indicating a voltage magnitude on bus 120. For example, each controller may have a nearby, dedicated respective sensor for sensing the bus voltage. In other words, system 100 may include a first voltage sensor on bus 120 near power converter 142, where source controller 144 receives a signal from the first voltage sensor. System 100 may also include a second voltage sensor on bus 120 near power converter 152 and a third voltage sensor on bus 120 near power converter 162, where storage controller 154 receives a signal from the second voltage sensor and load controller 164 receives a signal from the third voltage sensor. The voltage magnitude may be relatively uniform across bus 120, such that each of the voltage sensor may sense approximately the same voltage level. The voltage sensors may include a magnetic sensor, a current mirror, a shunt resistor, and/or any other type of voltage sensor.

In addition, each of controllers 144, 154, and 164 may be configured to sense the current and voltage of/across the respective one of energy resources 140, 150, and 160. For example, source controller 144 may be configured to receive signals indicating the voltage across the terminals of power source 140 and the current on each line of power source 140 (e.g., multiphase lines). Each of controllers 144, 154, and 164 may be configured to determine the magnitude of power received or produced by the respective one of energy resources 140, 150, and 160 based on the sensed voltage and current. Each of controllers 144, 154, and 164 may be configured to sense local parameters, control the respective power converter based on the sensed parameters, and share power on bus 120.

In some examples, controllers 144, 154, and 164 may not have any mutual communication among the controllers. However, each of controllers 144, 154, and 164 may be configured to individually receive commands from system controller 110 via a slow communication line, where system controller 110 may include a supervisory hybrid system controller (HSC). System controller 110 may be configured to initiate various ranges of commands to all the downstream primary controllers (e.g., controllers 144, 154, and 164) for various modes of operation. Controllers 144, 154, and 164 are configured to decode the communications from system controller 110 and execute the operating mode commanded by system controller 110.

Each of controllers 110, 144, 154, and 164 may include processing circuitry, which can include any suitable arrangement of hardware, software, instructions, firmware, or any combination thereof, to perform the techniques attributed to controllers 144, 154, and 164 herein. Examples of processing circuitry include any one or more microprocessors (e.g., a central processing unit—CPU, a graphics processing unit—GPU, and the like), digital signal processors (DSPs), application specific integrated circuits (ASICs), full authority digital engine control (FADEC) units, engine control units (ECUs), field programmable gate arrays (FPGAs), or any other equivalent integrated or discrete logic circuitry, as well as any combinations of such components. When the processing circuitry includes software or firmware, the processing circuitry further includes any hardware for storing and executing the software or firmware, such as one or more processors or processing units.

In general, a processing unit may include one or more microprocessors, DSPs, ASICs, FPGAs, or any other equivalent integrated or discrete logic circuitry, as well as any combinations of such components. Although not shown in FIG. 1, each of controllers 110, 144, 154, and 164 may include a memory configured to store data. The memory may include any volatile or non-volatile media, such as a random access memory (RAM), read only memory (ROM), non-volatile RAM (NVRAM), electrically erasable programmable ROM (EEPROM), flash memory, and the like. In some examples, the memory may be external to controllers 110, 144, 154, and 164 (e.g., may be external to a package in which one of controllers 110, 144, 154, and 164 is housed). The processing circuitry of controllers 110, 144, 154, and 164 may be configured to determine whether a sensed signal indicating the voltage magnitude on bus 120 is greater than or less than a threshold level. For example, the processing circuitry may include circuitry (e.g., digital or analog) and/or instructions for performing thresholding operations. Where this disclosure describes a controller determining whether a sensed signal is greater than or less than a threshold level, the controller may also determine whether the sensed signal is greater than or equal to the threshold level or determine whether the sensed signal is less than or equal to the threshold level in some instances.

It may be desirable to maintain the voltage magnitude on bus 120 within a target range. For example, the target range may be a range of DC voltage magnitudes or one or more ranges of frequencies, phases, and amplitudes. Maintaining the target voltage on bus 120 may allow for load 160 to operate in a desirable manner. For example, load 160 may be able to produce a desired amount of thrust when the voltage magnitude on bus 120 is within the target range. When the voltage magnitude on bus 120 deviates substantially downward, load 160 may no longer be able to function as desired.

One design technique for maintaining a target voltage on a bus is for a system controller to directly command each primary controller to increase to decrease power generation or power draw. This requires extensive communication between the system controller and all of the primary controllers that receive commands from the system controller.

Another design technique is to have system-level controller(s) that only communicate with primary controllers for like-type power converters. For example, an existing system can use droop control may include like-type power converters, where each droop controller controls the same type of power converter connected to the same type of energy resource. For example, an array of generators in an existing system may each be connected to a bus via a rectifier, where each droop controller controls one of the rectifiers. As used herein, the term "like-type" may refer to a set of rectifiers, a set of DC/DC converters, or a set of inverters. An inverter may be a non-like-type converter with respect to a rectifier.

In accordance with the techniques of this disclosure, system controller 110 is configured to send commands to two or more of controllers 144, 154, and 164, where these droop controllers control non-like-type power converters, and where at least two of the power converters have a differing topologies. A first topology may be a rectifier, a second topology may be a DC/DC converter (e.g., a boost or buck converter), and a third topology may be an inverter. In some examples, a rectifier may be arranged using the same topology as an inverter, but operated in a reverse direction. For example, system controller 110 can send a command to source controller 144, which may control a rectifier (e.g., power converter 142) connected between power source 140 and bus 120. System controller 110 can also send a command to storage controller 154, which may control a DC/DC converter (e.g., power converter 152) connected between energy storage device 150 and bus 120. Thus, power converters 142 and 152 may be non-like-type power converters that are integrated under the system droop control scheme. In addition, system controller 110 may be configured to also send a command to load controller 164, which may control an inverter (e.g., power converter 162) connected between load 160 and bus 120.

Responsive to receiving a command from system controller 110, each of controllers 144, 154, and 164 may be configured to set a threshold level for the voltage magnitude on bus 120. Each of controllers 144, 154, and 164 may be configured to compare the sensed voltage magnitude on bus 120 to the threshold level to determine how to control the respective one of power converters 142, 152, and 162. For example, responsive to determining that the voltage magnitude on bus 120 is less than the threshold level, each of controllers 144, 154, and 164 may be configured to increase the power delivered to bus 120 and/or to decrease the power drawn from bus 120. Responsive to determining that the voltage magnitude on bus 120 is greater than the threshold level, each of controllers 144, 154, and 164 may be configured to decrease the power delivered to bus 120 and/or to increase the power drawn from bus 120.

During each mode of operation, the algorithms implemented by controllers 144, 154, and/or 164 may not change. But controllers 144, 154, and 164 may be configured to seamlessly carry out each mode in order to maintain a stable common DC bus voltage without any visible or damaging transient reflections during control mode switchovers. According to control certification requirements for aerospace standard demands, controllers 144, 154, and 164 may have almost no change in control loops. Thus, a coordination control strategy named "Universal Autonomous Control" (UAC) has a single control algorithm framework for all of controllers 144, 154, and 164 so that commands from system controller 110 can be automatically decoded by controllers 144, 154, and 164. In some examples, each of controllers 144, 154, and 164 can operate without any mutual communication, such as communication between controllers 144 and 154 or between controllers 144 and 164. Controllers 144, 154, and 164 may be configured to execute the specific mode indicated in the command from system controller 110 without having to coordinate among the controllers 144, 154, and 164.

Additionally, all different types of distributed energy resources can be connected to bus 120 using a unified primary and secondary control strategy. As a primary control strategy, system controller 110 establishes and transmits set points to controllers 142, 152, and 162. Thus, in the example of an aerospace application, power source 140 generates a sufficient amount of power to maintain a stable bus voltage so that load 160 can generate the desired amount of propulsion.

From a secondary control point of view, all of the energy resources are identified as similar items, even though the actual energy resources differ by type. In addition, the switching frequencies of power converters 142, 152, and 162 that connect energy resources 140, 150, and 160 to bus 120 may be widely different. For example, power converter 142 may include a rectifier, and source controller 144 may be configured to cause power converter 142 to switch at thirty-five kilohertz. Power converter 152 may include a DC/DC converter, and storage controller 154 may be configured to cause power converter 152 to switch at sixty-five kilohertz. Each of controllers 144, 154, and 164 may be configured to interface with a respective one of power converters 142, 152, and 162 by activating and deactivating the switches of the respective power converter. In other words, each of controllers 144, 154, and 164 can cause the respective power converter to deliver, transfer, and/or draw a particular magnitude of power to or from bus 120.

System 100 may be configured to operate in various modes, where each mode is designed for a specific situation. In the context of aviation, the modes may be designed by in-flight, take-off, landing, cruise, and/or ground charging of energy storage device 150. System 100 may be configured with various operating conditions where power source 140 and energy storage device 150 are able to balance the load demand. Using UAC principles, controllers 144, 154, and 164 may be configured to establish set points and/or implement operating modes based on commands received from system controller 110. Controllers 144, 154, and 164 may be configured to also control power converters 142, 152, and 162 based on the set points and further based on locally sensed parameters. This control strategy may allow for quick responses to fluctuations in the voltage magnitude on bus 120 because of the seamless and autonomous operation of the primary controllers.

Figure 2:
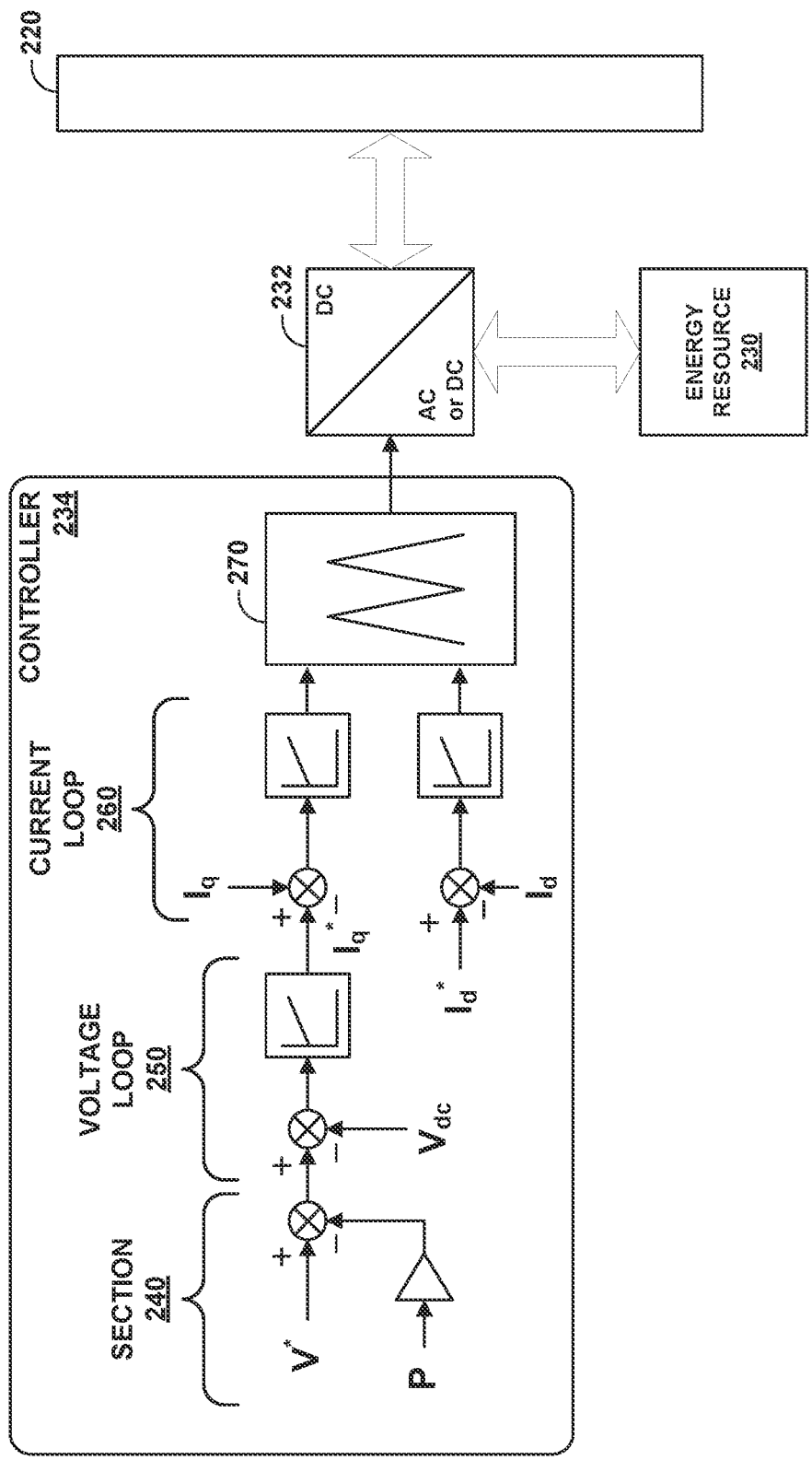
FIG. 2 is a conceptual block diagram illustrating a controller for an energy resource, in accordance with one or more techniques of this disclosure.

FIG. 2 is a conceptual block diagram illustrating a controller 234 for an energy resource 230, in accordance with one or more techniques of this disclosure. Controller 234 may represent one example of controller 144, 154, and/or 164 shown in FIG. 1. Controller 234 may be configured to implement an individual droop scheme in the primary control block as shown in FIG. 2. Controller 234 may control an AC/DC converter for a turbo generator or a DC/DC converter for an energy storage device. Controller 234 may be configured to implement an individual primary control strategy that includes a voltage-to-power droop section 240, outer voltage control loop 250, and inner current control loop 260.

In the example shown in FIG. 2, section 240 receives a first value indicating the sensed power generated or drawn by energy resource 230 and multiplies the first value by a droop gain for energy resource 230. Section 240 also receives a second value from the system controller, where the second value indicates the voltage set point for energy resource 230 and subtracts the product of the first value from the second value.

Voltage loop 250 receives the output of section 240 and subtracts a third value indicating a sensed voltage magnitude on bus 220 to generate a quadrature voltage reference. Controller 234 may be configured to determine the voltage magnitude based on a sensed signal received from a voltage sensor on bus 220 near power converter 232. Voltage loop 250 includes a proportional-integral controller configured to generate a target quadrature current based on the quadrature voltage reference, and current loop 260 subtracts an actual quadrature current from the target quadrature current. Voltage loop 250 also generates a target direct current based on the direct current, and current loop 260 subtracts an actual direct current from the target direct current. Controller 234 processes the outputs of current loop 260 and waveform 270 to generate control signals for power converter 232, which may include a pulse-width modulation (PWM) signal with a switching frequency and a duty cycle.

A storage controller may include similar modules to controller 234, except that the storage controller may not include the direct and quadrature currents. Instead, the storage controller may include a voltage loop that generates a target current and a current loop that subtracts an actual current from the target current. The storage controller then processes the outputs of the current loop and a waveform to generate control signals for a DC/DC converter.

Inner current loop 260 may include a proportional integrator controller. The gains of inner current loop 260 can be set in such a way that the bandwidth of current loop 260 is less than the respective switching frequency, less than one-half of the switching frequency, less than one-fifth of the switching frequency, and/or less than one-tenth of the switching frequency. Control loops 250 and 260 may be fast enough so that controller 234 is able to continuously react to disturbances in the voltage magnitude on bus 220. The switching frequency may depend on the type of energy resource 230 and power converter 232, the switching signal (e.g., control signal) may be a PWM signal generated by comparing the output of current loop 260 to waveform 270. Controller 234 can use the switching signal(s) to activate and deactivate the switches of power converter 232. In some examples, the system may also include a gate driver circuit for amplifying the power of the control signals before delivering the amplified control signals to the switches of power converter 232.

To make the control scheme work properly, the gains of voltage loop 250 can be set so that the bandwidth of current loop 260 is of the same order for an AC/DC converter connected to a power source and a DC/DC converter connected to an energy storage device, for example, one-tenth of the maximum electrical frequency of the AC power source. In some examples, the bandwidth of current loop 260 is less than one-fifth of the operating frequency of an AC power source. The individual AC/DC and DC/DC voltage versus the gain of the power droop curve can be set based on the maximum power and power transfer capability of converter 232. The system controller may be configured to initiate a command to each converter via a slow communication bus only without any inter-converter communication.

In some examples, a control scheme for an electrical power system may include control of a DC/DC power converter for an energy storage device that is fully synchronized with control of an AC/DC converter for a power source. Operation modes for the electrical power system include charging of an energy storage device, discharging of the energy storage device, buck mode when a low-voltage energy storage device is faulty but an auxiliary load is still receiving power from the bus simultaneously, and a mode with no change in primary control in any of the converters. In charging, discharging, and buck modes, of the converters, energy storage devices, and controllers in the electrical power system may be operating in a universal autonomous control mode. The voltage magnitude on the bus can be maintained to a rated value in steady-state (e.g. 1,080 volts) in all modes. Each of the primary controllers may be configured to automatically decode the commands received from the system controller possibly without any direct communication among the primary controllers.

Figure 3:
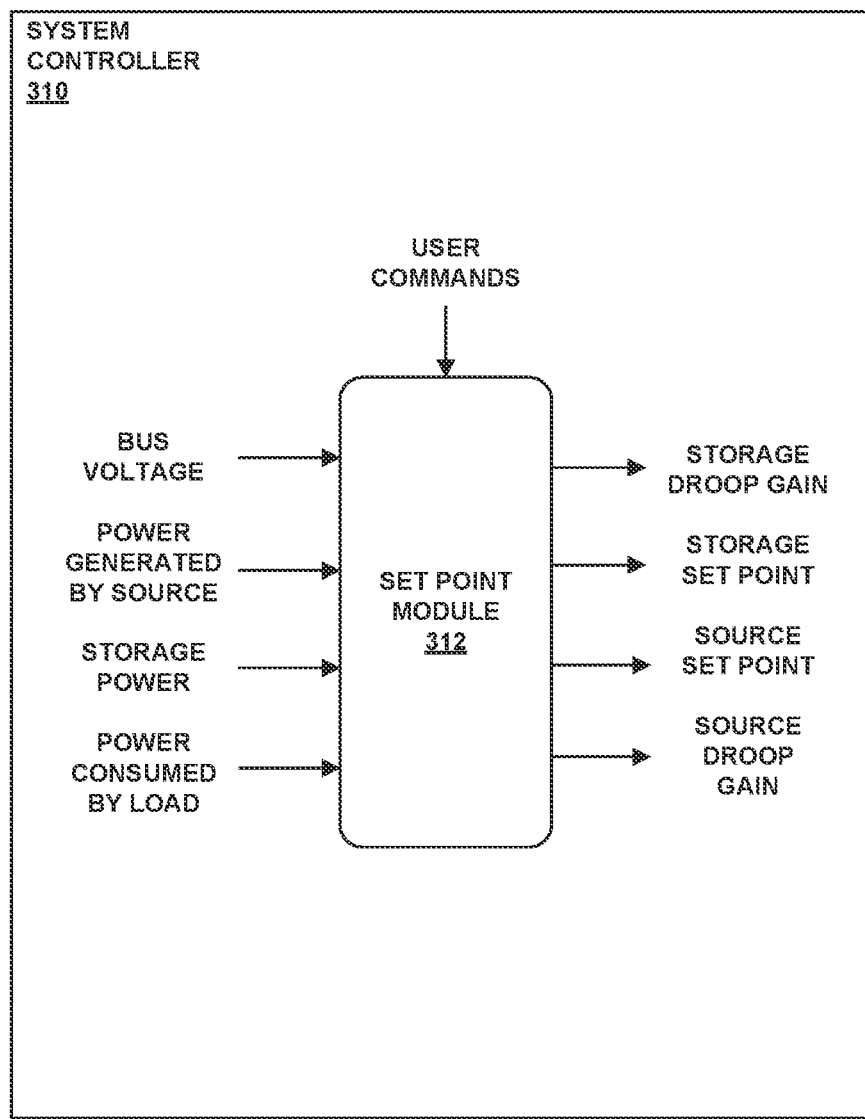
FIG. 3 is a conceptual block diagram illustrating a system controller, in accordance with one or more techniques of this disclosure.

FIG. 3 is a conceptual block diagram illustrating a system controller 310, in accordance with one or more techniques of this disclosure. System controller 310 may represent one example of system controller 110 shown in FIG. 1. System controller 310 includes set point module 312 for determining set points for a source controller and for a storage controller based on sensed parameters and based on user commands. The sensed parameters may include the voltage magnitude on the bus, the power generated by a source, the power drawn by a load, and the power discharged or drawn by an energy storage device. The user commands may include one or more power commands for an energy storage device and one or more loads and a voltage command for the voltage magnitude on the bus. Set point module 312 may also determine the storage and source droop gains based on the sensed parameters.

Equations (1)-(3) show the relationship between the voltage reference for an energy storage device ($V_{Bref}$) and the voltage references for two power sources ($V_{G1ref}$ and $V_{G2ref}$) and the droop gains ($D_B$ and $D_G$). Equations (4) and (5) show the output power of the DC/DC converter connected to the energy storage device ($P_B$) and the output power of the AC/DC converter connected to the power sources ($P_{G1}$ and $P_{G2}$) based on the total load power ($P_L$) and the number of generators ($N_G$) in operation. Equations (6) and (7) show the voltage magnitude of the bus due to activated power sources and energy storage device operation.

$$V_{Bref} = V_B^* - D_B P_B \tag{1}$$

$$V_{G1ref} = V_G^* - D_G P_{G1} \tag{2}$$

$$V_{G2ref} = V_G^* - D_G P_{G2} \tag{3}$$

$$P_B = \frac{1}{D_B}\left[V_B^* - \frac{\left(\frac{V_B^*}{D_B} + \frac{N_G \times V_G^*}{D_G}\right) - P_L}{\left(\frac{1}{D_B} + \frac{N_G}{D_G}\right)}\right] \tag{4}$$

$$P_{G1}, P_{G2} = P_G = \frac{1}{D_G}\left[V_G^* - \frac{\left(\frac{V_B^*}{D_B} + \frac{N_G \times V_G^*}{D_G}\right) - P_L}{\left(\frac{1}{D_B} + \frac{N_G}{D_G}\right)}\right] \tag{5}$$

$$V_{HVDC} = V_B^* - (D_B \times P_B) \tag{6}$$

$$V_{HVDC} = \tag{7}$$
$$V_B^* - \frac{D_B}{D_B}\left[V_B^* - \frac{\left(\frac{V_B^*}{D_B} + \frac{N_G \times V_G^*}{D_G}\right) - P_L}{\left(\frac{1}{D_B} + \frac{N_G}{D_G}\right)}\right] = \frac{\left(\frac{V_B^*}{D_B} + \frac{N_G \times V_G^*}{D_G}\right) - P_L}{\left(\frac{1}{D_B} + \frac{N_G}{D_G}\right)}$$

The system controller may be configured to iteratively determine the voltage set points using Equations (1)-(3) until the sensed power flow through each power converter is close enough to the power set points (e.g., within an acceptable range). The no-load droop settings of different AC/DC and DC/DC converters can be adjusted and initiated by the system controller to make sure the appropriate power flows from the distributed energy resources. In addition, the HVDC bus voltage magnitude can be set to the desired value. Equations (8) and (9) show two conditions: battery discharge or charge, and neither charge nor discharge.

$$V_G^* - V_B^* = P_L \frac{D_G}{N_G} - P_B \frac{D_G + N_G D_B}{N_G} \tag{8}$$

$$V_{HVDC} = V_B^* - D_B P_B \tag{9}$$

Figure 4:
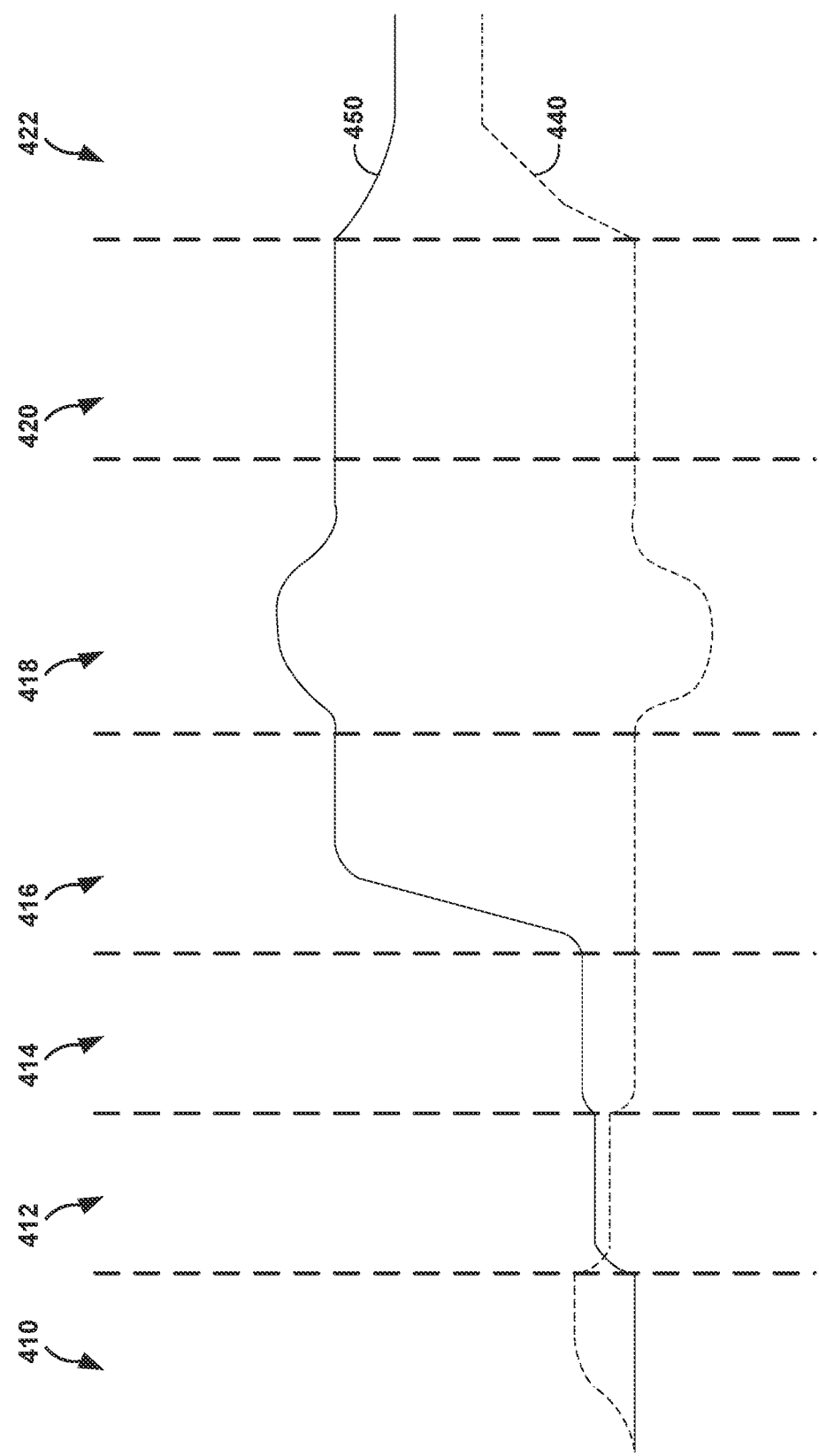
FIG. 4 is a timing diagram illustrating the charging and discharging of an energy storage device, in accordance with one or more techniques of this disclosure.

FIG. 4 is a timing diagram illustrating the charging and discharging of an energy storage device, in accordance with one or more techniques of this disclosure. Power source 140 and energy storage device 150 shown in FIG. 1 may be configured to operate in the power generation, charging, and discharging modes depicted in FIG. 4. Using the system framework described herein, the mode transitions depicted in FIG. 4 can occur without coordination by a central controller. Instead, the system controller can issue a command to one or more of the primary controllers, and the remaining primary controllers will react to changes in the voltage magnitude on the bus.

In phase 410, the energy storage device discharges to regulate the voltage magnitude on the bus, and the power sources start up at low load. In phase 412, the energy storage device and the power sources produce approximately equal amounts of power. In phase 414, the power sources produce all of the power for the system, while the energy storage device is not charging or discharging. In phase 416, the power sources ramp up the power generation, while the energy storage device is not charging or discharging.

In phase 418, the storage controller causes the energy storage device to charge using power received from the bus. In addition, in phase 418, the power sources further increase power generation to provide power for the energy storage device and loads within the system. In phase 420, the energy storage device returns to not charging or discharging, and the power sources produces all of the power consumed by the load. In phase 422, the energy storage device begins discharging to provide power, while the power sources continue producing power but at a lower rate than phases 418 and 420.

The mode transitions shown in FIG. 4 can be made without coordination by a central controller. For example, to transition from phase 410 to phase 412, the system controller can send a command to the source controller(s) to produce more power, which may increase the voltage magnitude on the bus. The storage controller senses the increased voltage magnitude on the bus and reduces the discharge rate of the energy storage device. A similar command from the system controller may cause the transition from phase 412 to phase 414. As another example, the system controller may command the storage controller to enter a charging mode in phase 418. The source controller(s) may be configured to cause the power sources to produce more power in phase 418 in response to sensing the voltage magnitude on the bus has dropped after the energy storage device begins charging.

In contrast, a centralized system could experience large spikes, troughs, and hard transients in the voltage magnitude on the bus. For example, a central controller would command an energy storage device to begin discharging and would also command a power source to produce less power. The commands would likely be implemented by the storage controller and source controller at different times, and there would be a considerable lag in the implementation by one of the controllers. The lag in implementation would result in too much power being delivered to or drawn from the bus. For even a small amount of time, this additional power would cause a substantial change in voltage that pushes the voltage magnitude on the bus outside of the acceptable range.

The capacitors in a system of this disclosure may be few and/or small, meaning that a small change in energy may cause a relatively large change in the voltage magnitude on the bus. Without large capacitors on the bus, the bus voltage may move quickly. It may be desirable to not add capacitors to the system because of the size, weight, cost, and manufacturing time and complexity involved with adding capacitors to a system. A decentralized control scheme may allow for quickly responding to undesirable changes in bus voltage.

Additional example details of determining a desired power set point for an energy storage device are described in commonly assigned U.S. Provisional Patent Application Ser. No. 63/053,107, entitled "Hybrid Propulsion System Power Management," filed on Jul. 17, 2020, the entire contents of which are incorporated herein by reference. Equations (10) and (11) show the derivation of the set point voltages for an energy storage device ($V_B^*$) and for a power source ($V_G^*$) based on the power set points, which may be set by user commands. Equation (12) is general power balance relationship between the load, power sources, and energy storage device.

$$V_B^* = P_B^* D_B + V_{HVDC} \quad (10)$$

$$V_G^* = (P_L - P_B^*)\frac{D_G}{N_G} + V_{HVDC} \quad (11)$$

$$P_L = P_{G1} + P_{G2} + P_B \quad (12)$$

The system controller may be configured to calculate load power ($P_L$,) using the sum of feedback values from all sources (e.g., power sources and energy storage devices), as reported by their local controllers over the slow communication line. The system controller may be configured to further iterate the determination of voltage set points until the power feedback from each energy resource is sufficiently close to the target power values (e.g., the power set points). This approach may make the system more robust to unmeasured parasitic loads and load tracking errors. However, the system controller may be configured to use feedback from the loads or feedforward from load demands as a feedforward control term, for fault detection, and/or as a backup in the event of signal loss (e.g., fault accommodation).

Figure 5:
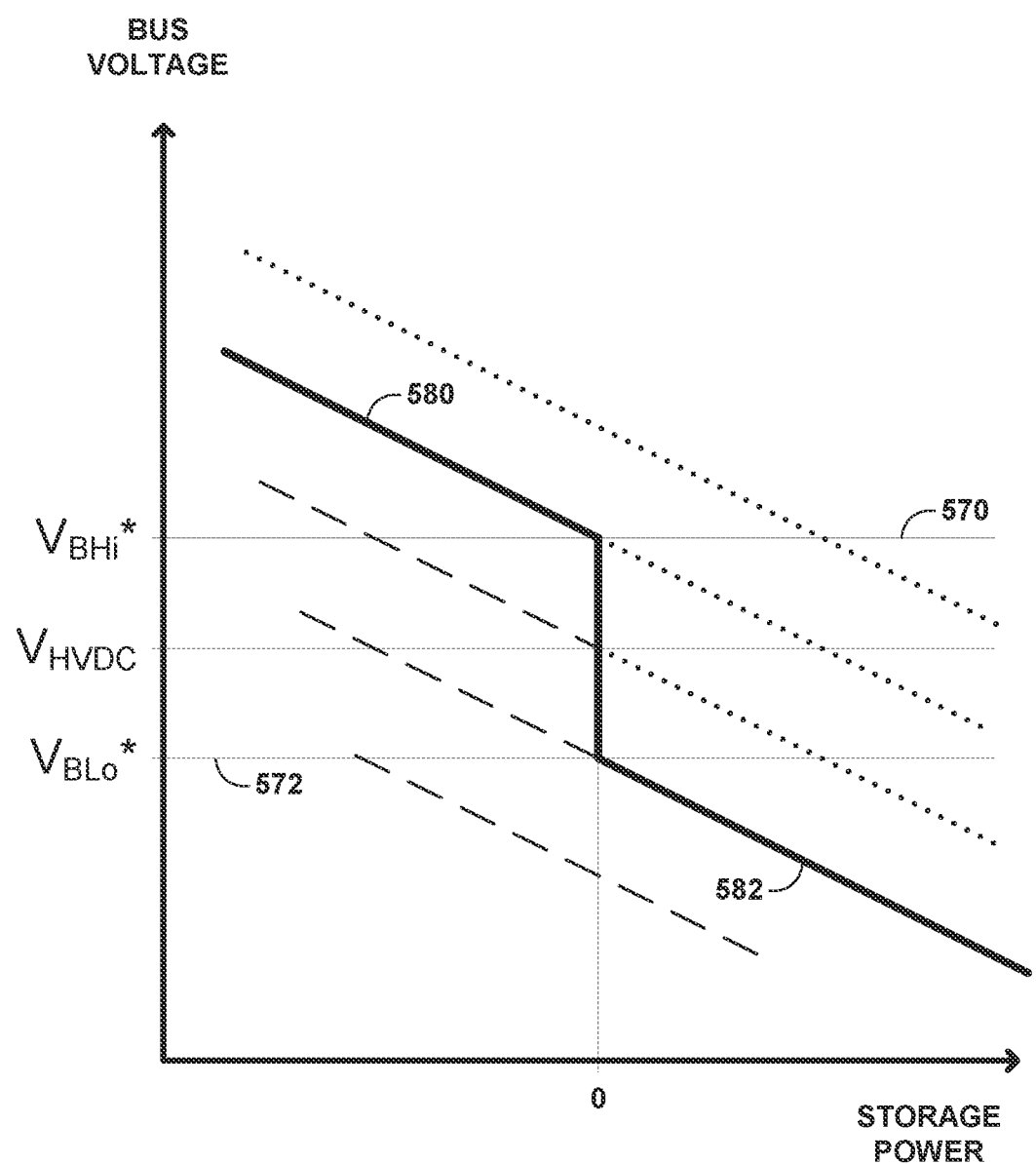
FIG. 5 is a diagram illustrating a voltage deadband for an energy storage device, in accordance with one or more techniques of this disclosure.

FIG. 5 is a diagram illustrating a voltage deadband for an energy storage device, in accordance with one or more techniques of this disclosure. Storage controller 154 shown in FIG. 1 may be configured to operate the voltage deadband shown in FIG. 5. The control of the energy storage device includes droop slope 580 for charging and droop slope 582 for discharging. The thick line that includes droop slopes 580 and 582 is the typical operating line for the storage controller. The voltage deadband exists at the zero power point in the voltage span between maximum set point 570 and minimum set point 572. Maximum set point 570 is the charge-side threshold level, and minimum set point 572 is the discharge-side threshold level. A storage controller may be configured to establish or adjust set points 570 and 572 based on command(s) received from a system controller. In some examples, the storage controller is configured to change set points 570 and 572 only in response to receiving a command received from the system controller.

Battery life diminishes as an energy storage device cycles between charging and discharging, which can occur when a storage controller operates the energy storage device near zero power without a voltage deadband. An existing controller would tend to cycle the energy storage device between charging and discharging in response to fluctuations in system voltage. While quick cycling may be desirable in some systems for immediately responding to power transients, the additional cycle life adds undue overdesign, and thus weight, for an aerospace application. To address this, a storage controller may be configured to implement a voltage deadband to control the power converter connected between the energy storage device and the bus. When the voltage magnitude on the bus is within the storage deadband, the storage controller may cause no power to be released or consumed by the energy storage device. The storage controller may be configured to override and/or disable the voltage loop within the voltage deadband by generating and delivering a constant zero command to the inner loop.

The storage controller may be configured to determine whether the voltage magnitude on the bus is outside of the voltage deadband defined by set points 570 and 572. The vertical axis of FIG. 5 represents the bus voltage magnitude sensed by the storage controller. Responsive to sensing that the voltage magnitude on the bus is greater than or equal to maximum set point 570, the storage controller may be configured to cause the energy storage device to charge by receiving an amount of power from the bus. Responsive to sensing that the voltage magnitude on the bus is less than or equal to minimum set point 572, the storage controller may be configured to cause the energy storage device to discharge by delivering an amount of power to the bus. The storage controller may be configured to determine the amount of charging power based on droop slope 580 and the amount of discharging power based on droop slope 582.

The system controller may be configured to independently adjust no-load voltages for charging and discharging, which are represented by maximum set point 570 ($V_{BHi}^*$) and minimum set point 572 ($V_{BLo}^*$), relative to the original no-load command, $V_B^*$, as shown in Equations (14) and (15). The system controller can send indications of the no-load commands to the storage controller. Vmax and Vmin may be constant values defining the maximum extent of the voltage range of the deadband. The storage controller may be configured to use Equation (13) to implement a voltage deadband.

$$V_{Bref} = \begin{cases} V_{BHi}^* - D_B P_B, & V_B > V_{BHi}^* \\ V_B, & V_{BLo}^* < V_B < V_{BHi}^* \\ V_{BLo}^* - D_B P_B, & V_B < V_{BLo}^* \end{cases} \quad (13)$$

$$V_{BHi}^* = \begin{cases} V_B^*, & P_B^* > 0 \\ \max(V_B^*, V_{max}), & P_B^* \le 0 \end{cases} \quad (14)$$

$$V_{BLo}^* = \begin{cases} \min(V_B^*, V_{min}), & P_B^* \ge 0 \\ V_B^*, & P_B^* < 0 \end{cases} \quad (15)$$

The system controller can send a command to the storage controller to discharge the energy storage device by increasing the lower threshold level. In response, the storage controller can increase the lower threshold of the deadband, which reduces the size of the deadband. This is indicated by the dotted lines for $P_B^* \ge 0$ in FIG. 5. If the lower threshold is increased enough, the size of the deadband reaches zero. When the span of the deadband shrinks to zero, as indicated by $V_B^*$=Vmax, the storage controller may be configured to operate the energy storage device in normal droop control with no deadband. In a situation with no deadband, the maximum and minimum set points are the same: $V_{BHi}^* = V_{BLo}^* = V_B^*$. In other words, shrinking the deadband to zero may result in a standard, continuous droop curve where only one voltage magnitude is associated with zero power.

The system controller can send a command to the storage controller to charge the energy storage device. In response, the storage controller can decrease the upper threshold of the deadband, which reduces the size of the deadband. This reduction is indicated by the dashed lines for $P_B^* \le 0$ in FIG. 5. If the upper threshold is lowered far enough, the size of the deadband reaches zero.

Compared to moving a deadband of fixed size, this approach does not increase the overall voltage range of the storage controller. This approach may improve stability when power is near zero by reducing the size of the voltage discontinuity. In contrast, moving a fixed-size deadband would increase the range from $[-D_B \times P_{Bmax} < V_B < -D_B \times P_{Bmin}]$ to $[Vmin + D_B \times P_{Bmin} < V_B < Vmax + D_B \times P_{Bmax}]$.

The storage controller may be configured to cause the energy storage device to release power to the bus in response to determining that the voltage magnitude on the bus is less than the lower end of the deadband. The storage controller may be configured to cause the energy storage device to receive power to the bus in response to determining that the voltage magnitude on the bus is greater than the upper end of the deadband. The storage controller can control the power converter and/or a switch network between the power converter and the energy storage device.

The maximum deadband voltage range may be approximately equal to the operating range of the power source(s), expressed by $-D_G \times P_{Gmax} < V_B < -D_G \times P_{Gmin}$. For example, the target bus voltage may be approximately 1,080 volts, and the span of the voltage deadband may be approximately ten, twenty, or thirty volts. Thus, the power source(s) may be configured to supply increased or decreased power within a range of bus voltages defined by the storage deadband (e.g., before the energy storage device feeds in). When the voltage magnitude of the bus strays from the target value, the power source(s) may first feed in, followed by the energy storage device(s) after the voltage magnitude crosses a deadband threshold.

Above this range, the deadband can introduce a voltage discontinuity where no power source or energy storage device responds to changes in load. However, at or below this range, the deadband just causes devices to operate sequentially such that the power sources respond to changes in power causing small voltage transients on the bus. In examples in which only the energy storage devices respond to changes in power, large voltage transients may be introduced on the bus. In examples in which both the power sources and energy storage devices respond to changes in power, medium voltage transients may result.

Figure 6:
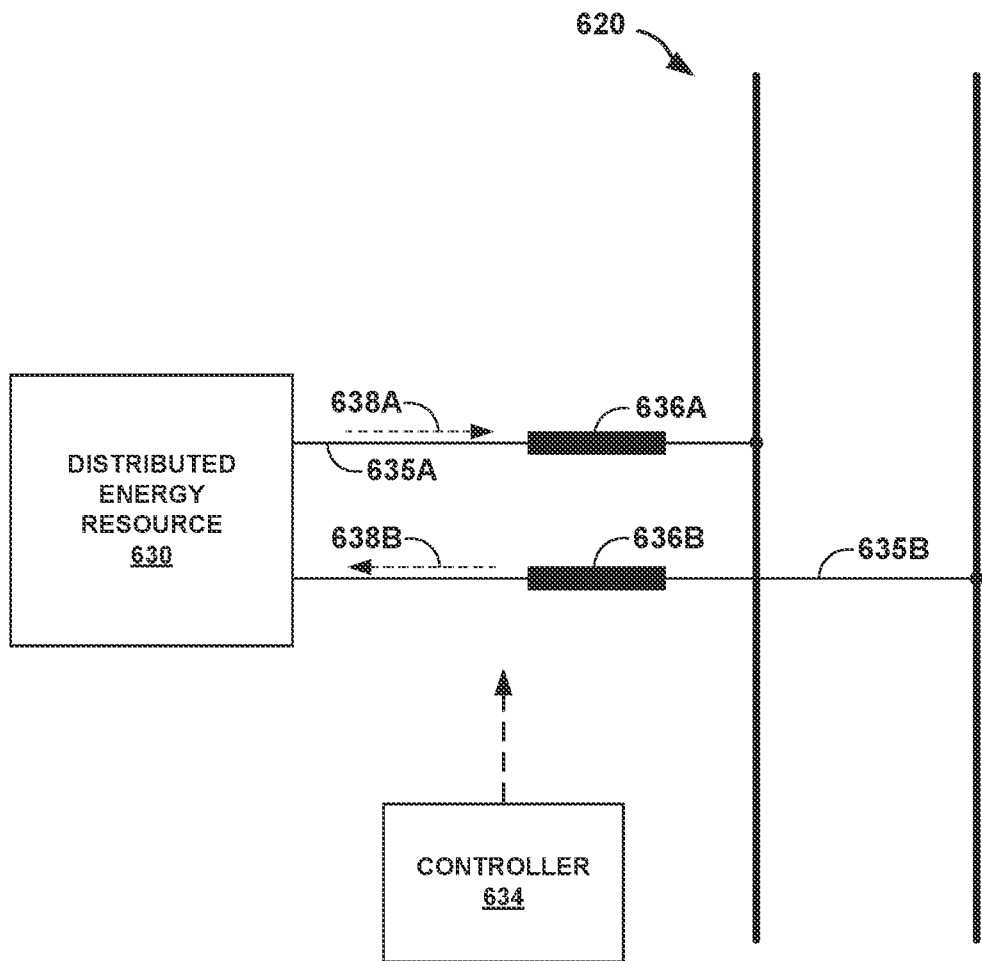
FIG. 6 is a conceptual block diagram illustrating voltage versus current droop implementation method, in accordance with one or more techniques of this disclosure.

FIG. 6 is a conceptual block diagram illustrating voltage versus current droop implementation method, in accordance with one or more techniques of this disclosure. Energy resource 630 may represent one example of resource 140, 150, and/or 160 shown in FIG. 1, and controller 634 may represent one example of controller 144, 154, and/or 164 shown in FIG. 1. Each primary controller (e.g., source controller, storage controller, or load controller) may sense the bus voltage and the output power droop. These variables may feed into the outer most control loop of the respective controller. The outer most voltage and droop curve, the voltage loop, and the inner current or power loop operate based on the local measurement points (e.g., sensed current, voltage, and/or power).

In addition, a cable may be connected between the local measurement point of energy resource 630 and bus 620. In examples in which the cable length is too long, the power sharing may be slightly different than an amount determined using an ideal equation due to power dissipation in the transmission cable. Controller 634 may be configured to address this issue by switching from a voltage versus output power droop curve to a voltage versus current droop curve.

Distributed energy resource 630 is connected to bus 620 using positive and negative cables 635A and 635B. Each of cables 635A and 635B includes a built-in resistance 636A and 636B with value of Rn. The terminal voltage (e.g., local voltage measurement) of energy resource 630 can be represented as $V_{DERn}$. Current 638A flows from energy resource 630 to bus 620, and current 638B flows from bus 620 to energy resource 630. The droop operation that is performed by controller 634 is typically based on local voltage and current measurements. Equation (16) represents the local voltage versus current droop loop effect. Equation (17) is based on Kirchoff's Voltage Law. Equation (18) results from combining the previous two equations.

$$V_{DERn} = V^*_n - D_n \times I_n \quad (19)$$

$$V_{DERn} = V_{HVDC} + 2 \times R_n \times I_n \quad (20)$$

$$V_{HVDC} = V^*_n - (D_n + 2R_n)I_n = V^*_n - D_{neff} \times I_n \quad (21)$$

The variable $D_{neff}$ relates the voltage magnitude on bus 620 and currents 638A and 638B droop in steady-state. Controller 634 may implement this loop based on local voltage measurements. Thus, the system controller may be configured to also implement the same equations without any other modification in the algorithms.

Figure 7:
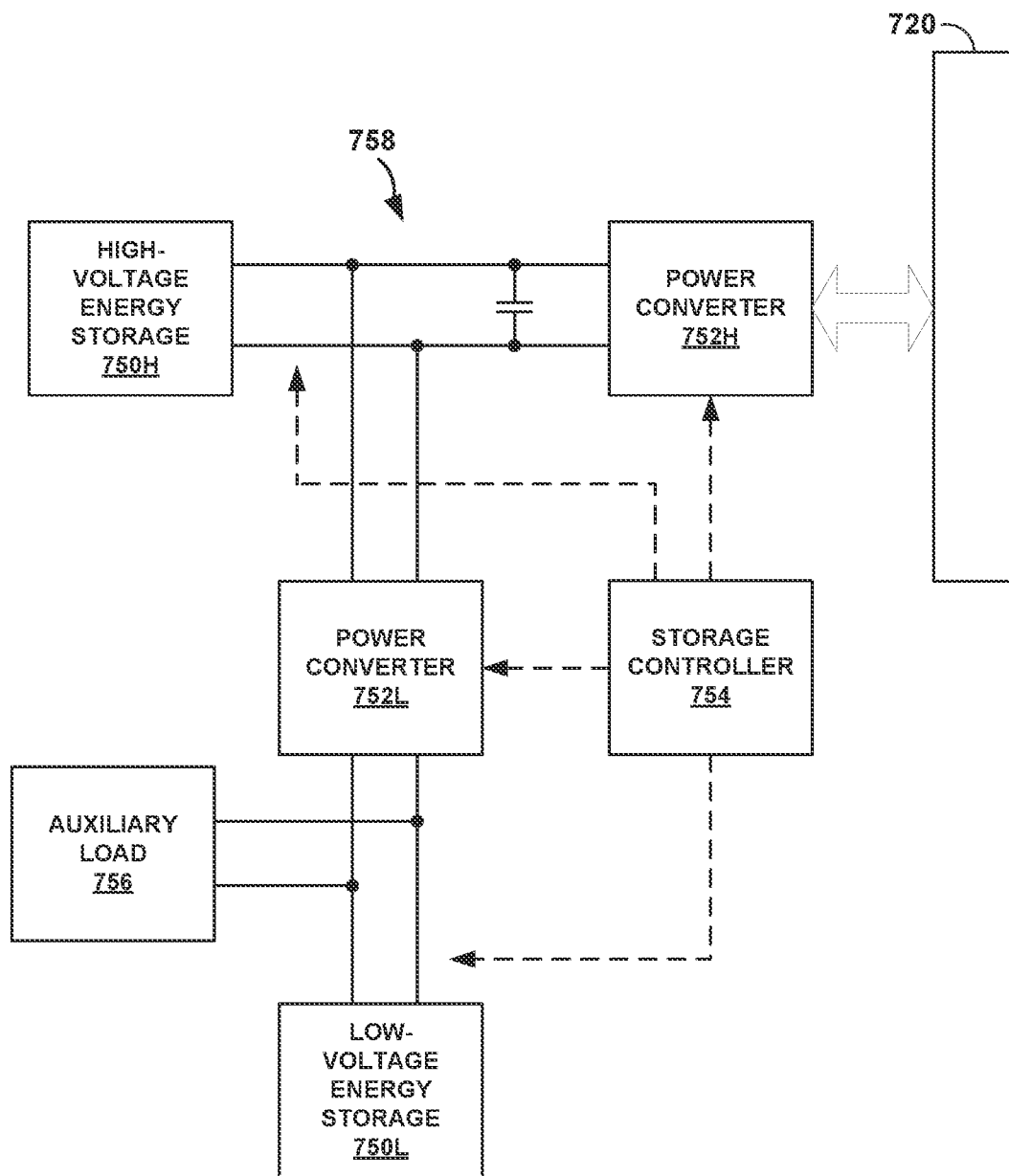
FIG. 7 is a conceptual block diagram illustrating high- and low-voltage energy storage devices, in accordance with one or more techniques of this disclosure.

FIG. 7 is a conceptual block diagram illustrating high- and low-voltage energy storage devices 750H and 750L, in accordance with one or more techniques of this disclosure. Energy storage device 750H may represent one example of energy storage device 150, power converter 752H may represent one example of power converter 152, and storage controller 754 may represent one example of storage controller 154 shown in FIG. 1. Energy storage device 750H may be connected to bus 720 through conductors 758 and power converter 752H, which may include a DC/DC converter. Energy storage device 750H may be configured to complement the main propulsive power generated by a power source (e.g., generator) during the hybrid electric propulsor operating mode. In addition, energy storage device 750L may be configured to complement the reliability and/or sustainability of the energy storage device 750H by providing a supplemental power supply to auxiliary load 756, which may include an engine controller (e.g., a full authority digital engine controller), other engine electronics, a fuel pump, a hydraulic pump, and/or an actuator. In examples in which auxiliary load 756 is part of an aircraft engine, the connection to auxiliary load 756 may be separate from the low-voltage power supply for the airframe of the aircraft. Storage controller 754, a load controller, and a source controller are other examples of auxiliary load 756 that can receive power from energy storage device 750L and/or from power converter 752L.

Energy storage device 750H may include a high-voltage battery, and energy storage device 750L may include a low-voltage battery. A no-load voltage of energy storage device 750H may be higher than a no-load voltage of energy storage device 750L. For example, the no-load voltage of energy storage device 750H may be several hundred volts, and the no-load voltage of energy storage device 750L may be less than one hundred volts. Energy storage device 750L may be configured to deliver power to bus 720 through power converters 752H and 752L while discharging and to receive power from bus 720 through power converters 752H and 752L while charging.

In healthy condition, energy storage device 750H may be able to supply a sufficient amount of power to auxiliary load 756 through power converter 752L. This protocol will also work even if energy storage device 750L is faulty and disconnected. In response to determining that energy storage device 750L is faulty, storage controller 754 may be configured to control power converter 752L to deliver power from energy storage device 750H to auxiliary load 756. However, in examples in which both of energy storage devices 750H and 750L are faulty and disconnected, auxiliary load 756 may still need power to maintain engine operations so that propulsive power control capability can be maintained. Even in examples in which both of energy storage devices 750H and 750L fail, power converters 752H and 752L may be configured to continue operating to deliver power from bus 720 to auxiliary load 756. The same control strategy will work without any modification if energy storage device 750L is healthy and energy storage device 750H is faulty. This will add value since flight can be maintained longer after energy storage device 750H has failed and energy storage device 750L is live but not burdened alone.

In examples in which power converter 752H loses the capability of participating in the system-wide control framework because the voltage across the terminals of energy storage device 750H may not be stable. If the voltage across the terminals of energy storage device 750H is kept within a certain voltage range (e.g., 700 to 850 volts), power converter 752L may be configured to supply stable output voltage (e.g. 24 volts) for auxiliary load 756 without interruption. In addition, power converter 752L may be configured to operate as a buck converter by stepping down the voltage level across conductors 758 and/or across the terminals of energy storage device 750H to a lower voltage level for use by energy storage device 750L and auxiliary load 756.

In a fault condition, power converter 752H may be configured to supply only enough power for auxiliary load 756 (e.g., two to four kilowatts), which pushes the operation to discontinuous mode of operation (DCM). In DCM, the efficiency of power converter may fall drastically, as compared to a normal mode of operation. The control strategy is to control the power passing through power converter 752H using a voltage control loop fast enough so that storage controller 754 can adjust droop settings fast enough to regulate the voltage across the terminals of energy storage device 750H within regulated boundaries. The capacitance of an input capacitor of power converter 752H plays an important role in maintaining the voltage across the terminals of energy storage device 750H.

In the example shown in FIG. 7, power converter 752L is not directly connected to bus 720 but is instead indirectly connected to bus 720 through power converter 752H. Although FIG. 7 depicts power converter 752L as connected to bus 720 through conductors 758 and power converter 752H, in some examples power converter 752L is directly to bus 720. In further examples, power converter 752L may be directly connected to bus 720 and indirectly connected to bus 720 through power converter 752H.

For example, power converter 752L may be connected to bus 720 and/or power converter 752H through a network of diodes and switches. These arrangements can allow for auxiliary load 756 to receive power from bus 720, energy storage device 750H, and/or energy storage device 750L when there is a fault somewhere in the system. The fault may occur in one of the energy storage devices, in one of the power converters, and/or in the lines between one of the components in the system. In the event of a fault on one or both of energy storage devices 750H and 750L, storage controller 754 can communicate an indication of the fault to the system controller, and the system controller may be configured to treat power converter 752H as an auxiliary load connected to bus 720. Power converter 752H may be configured to operate in buck mode to deliver power from bus 720 to power converter 752L, which can deliver power to auxiliary load 756. The efficiency of power converters 752H and/or 752L may be lower and less consistent during fault operation, as compared to during normal operation.

Figure 8A:
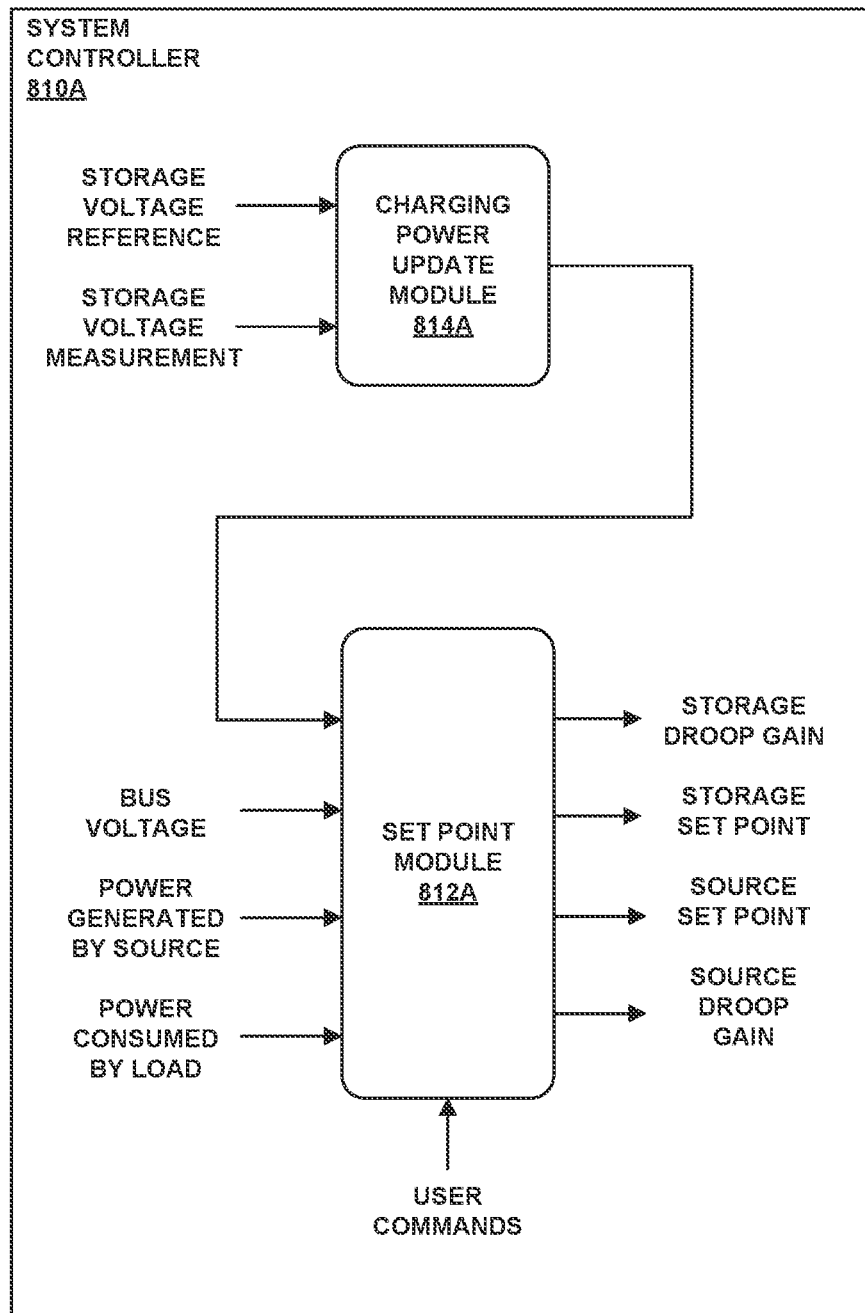
FIG. 8A is a conceptual block diagram illustrating a system controller in the context of a storage fault, in accordance with one or more techniques of this disclosure.

FIG. 8A is a conceptual block diagram illustrating a system controller in the context of a storage fault, in accordance with one or more techniques of this disclosure. System controllers 810A and/or 810B may represent examples of system controller 110 shown in FIG. 1. FIG. 8A also illustrates the overall control strategy of system controller 810A, particularly in the context of a fault on the electrical lines connected to an energy storage device. This type of fault can be handled by changing the control firmware in the high-voltage power converter connected between the energy storage device and the bus. System controller 810A may include charging power update module 814A together with set point module 812A without modifying any control loops in the primary controllers of the energy resources. System controller 810A may be configured to generate set points based on sensed parameters (voltage, current, power etc. from the power circuit) and user commands (e.g., power and voltage commands from a pilot). The framework shown in FIG. 8A may reduce the number of control algorithms that have to go through the qualification and certification process for an aerospace application.

Returning to FIG. 7, auxiliary load 756 can be modeled as a constant current source. This is manifested as load power $P_{aux}$ in Equations (22)-(24). Due to DCM, the power dissipation caused by power converter 752H may be high and unpredictable and is represented as $P_{loss}$ in Equations (22) and (23). Considering global stability, a pure voltage error square-based positive definite Lyapunov function gives rise to Equation (24). With a sufficiently high value of $\lambda$ and a known value of $P_{aux}$, storage controller 754 can implement voltage control with Equation (24). $C_{in}$ represents the capacitance connected across conductors 758, $v_{in}$ represents the voltage across conductors 758, $v_{in}^*$ represents the set point for vin, and $\lambda$ is a converging constant.

$$P_B = P_{aux} + P_{loss} + \frac{d}{dt}\left(\frac{1}{2}C_{in}v_{in}^2\right) \quad (22)$$

$$P_B = \lambda C_{in} v_{in}(v_{in}^* - v_{in}) + P_{aux} + P_{loss} \quad (23)$$

$$P_B = \lambda C_{in} v_{in}(v_{in}^* - v_{in}) + P_{aux} \quad (24)$$

Returning to FIG. 1, there are two possible modes of operation for system 100: default UAC and modified UAC. In the default UAC, system controller 110 may be configured to control source controller 144 and storage controller 154, while load controller 164 may be independently controlled using, for example, torque control mode. In examples in which power source 140 fails and system controller 110 does not receive the information indicating the failure due to a slow update rate between controllers 110 and 144, system controller may operate in a blinded operation mode.

In this situation, the load power may not automatically adjust on its own causing the voltage magnitude on bus 120 to crash down due to severe power imbalance. This can create a serious problem for emergency operations in a hybrid electric propulsion system in an aerospace application. In modified UAC mode of operation, system controller 110 is configured to transmit set point commands to load controller 164, as well as to controllers 144 and 154 to make sure system 100 remains stable. The voltage control for regulation of bus 120 during faults is important, particularly in examples in which voltage magnitude of bus 120 goes out of range of a certain value. The propulsors in load 160 may start malfunctioning, and other controllers 144 and 154 may be configured to implement protection schemes in the event of an errant bus voltage.

In the modified UAC mode, system controller 110 may be configured to send commands to load controller 164. System 100 may include two rectifiers, two propulsors, and an energy storage device may each implement the same type of primary control utilizing droop. As compared to the default UAC, there may not need to be no change in primary control. In addition, each of energy resources 140, 150, and 160 may be configured to maintain the stability of the local voltage. One potential advantage is that, if one or both rectifiers fail and system controller 110 is in blind mode, load controller 164 may be configured to temporarily decide to autonomously and automatically perform a load shedding operation.

Under the modified UAC, load controller 164 may be configured to automatically perform a propulsor regenerative operation without changing control mode in power converter 162. Storage controller 154 may be configured to autonomously control the charging and discharging of energy storage device 150. Each of controllers 144, 154, and 164 may be configured to automatically decode commands from system controller 110 even without any communication among energy resources 140, 150, and 160 or controllers 144, 154, and 164.

System 100 may be designed to handle the power capacity of each of energy resources 140, 150, and 160, as well as the appropriate power flow from each of energy resources 140, 150, and 160. For example, controllers 110, 144, 154, and 164 may be configured to manage the charging and discharging of energy storage device 150, the supply of power by power source 140, and load 160 taking power or regenerating. Controllers 110, 144, 154, and 164 may be configured to also control the voltage magnitude on bus 120 to a desired value.

Equations (25)-(27) show the voltage set points for power source 140, energy storage device 150, and load 160, respectively ($V_G^*$, $V_B^*$, and $V_P^*$). $D_G$, $D_B$, and $D_P$ represent the droop gains of the power source 140, energy storage device 150, and load 160, respectively. $P_B$ represents the power output of energy storage device 150, and $P_L$ represents the power consumed by load 160. $N_G$ and $N_P$ represent the number of generators connected to bus 120 (e.g., as power source 140) and the number of propulsors connected to bus 120 (e.g., as load 160).

$$V_B^* = P_B D_B + V_{HVDC} \quad (25)$$

$$V_P^* = \frac{P_L}{N_P} D_P + V_{HVDC} \quad (26)$$

$$V_G^* = \frac{(P_L - P_B)}{N_G} D_G + V_{HVDC} \quad (27)$$

Figure 8B:
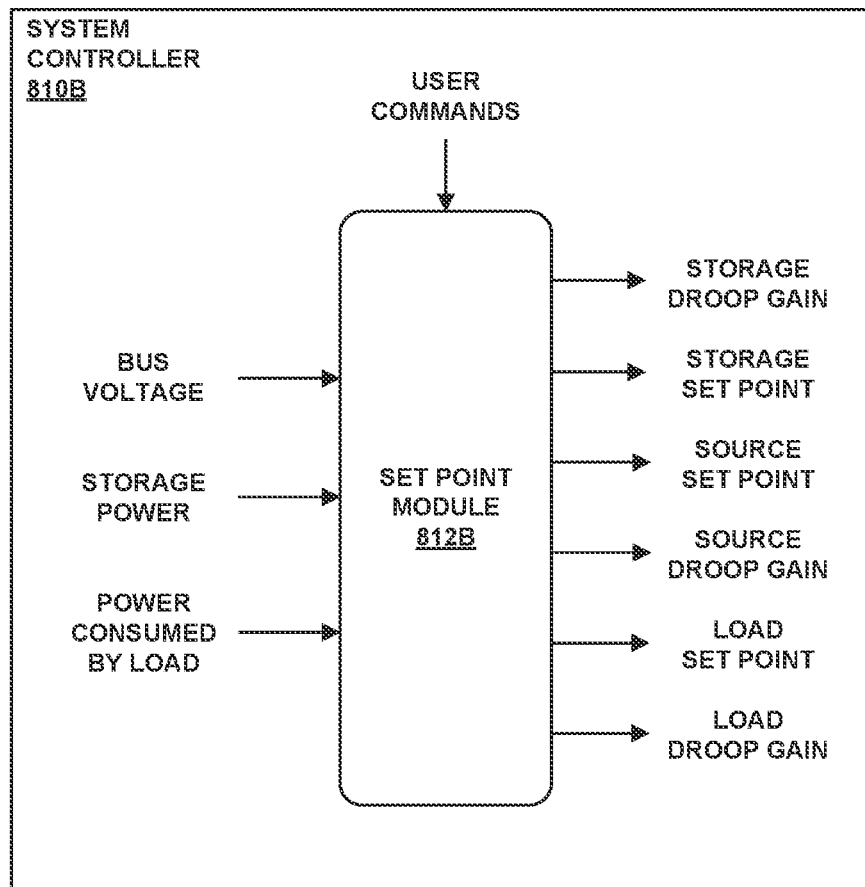
FIG. 8B is a conceptual block diagram illustrating a system controller for generating a load set point, in accordance with one or more techniques of this disclosure.

FIG. 8B is a conceptual block diagram illustrating a system controller 810B for generating a load set point, in accordance with one or more techniques of this disclosure. Set point module 812B is similar to set point module 312 shown in FIG. 3, except that set point module 812B is configured to generate a voltage set point and a droop gain value for a load based on sensed parameters and user commands. In some examples, system controller 810B is configured to implement the modified UAC control scheme described herein.

Returning to FIG. 1, system 100 may experience a failure in power generation, which may be caused by a fault in power source 140, power converter 142, and/or controller 144. In some examples, energy storage device 150 is operating in no-charge/no-discharge mode, and one of power sources 140 is faulty and disconnected. System controller 110 may be configured to implement modified UAC using voltage versus current droop.

In the event of a fault in power converter 142, which disconnects power sources 140 from bus 120, load controller 164 may be configured to reduce the power intake of power converter 162 and load 160. Power converter 142 may include a rectifier with one or more half-bridge circuits, where the fault may occur in a switch in a half-bridge circuit. Even in examples in which power source 140 disconnects from bus 120, the voltage magnitude on bus 120 may maintain a target value if other power sources and energy storage device 150 increase power output and load 160 decreases power consumption. Under the modified UAC, load controller 164 may be configured to sense a temporary decrease in the voltage magnitude on bus 120. Responsive to sensing the reducing voltage magnitude on bus 120, load controller 164 may be configured to control power converter 162 to reduce the power consumed by load 160.

Under the modified UAC, system controller 110 can send commands to all of energy resources 140, 150, and 160. As an example, system controller 110 may be configured to send power commands to load controller 164, and load controller 164 may be configured to control power converter 162 so that the power load is shared between multiple loads in a desired manner. However, in some examples, system controller 110 may lose communication with load controller 164 due to, for example, a fault in the communication line. In examples in which communication is lost, the load commands sent by system controller 110 to load controller 164 will not arrive at load controller 164, and load 160 will either over satisfy or under-satisfy the load conditions (e.g., supply more or less power than selected or commanded by a user).

Load controller 164 may be configured to operate autonomously under modified UAC by automatically modifying the power consumed by load 160. In doing so, load controller 164 can regulate the voltage magnitude on bus 120 even if the communication between controllers 110 and 164 is down. This regulation will not only stabilize the voltage magnitude on bus 120, but load controller 164 may be configured to also automatically adjust the power consumed by load 160 to maintain the stability when communication is lost. In some examples, load controller 164 may be configured to reduce a threshold level used for determining when to load shed in response to determining that a fault has occurred on the communication line between controllers 110 and 164.

During blinded operation, controllers 144 and 154 may be configured to set the operating voltages of energy resources 140 and 150 to a baseline level to enable power converter 162 to operate autonomously. For example, controllers 144 and 154 may be operating with a voltage set point for bus 120 that is between 1,020 and 1,140 volts with an enabled deadband for activation or deactivation of energy resources 140 and 150. The baseline level used in situations of communication loss may be higher than the standard operating level to ensure that a sufficient amount of power is delivered to load 160 or lower than the standard operating level to prevent load 160 from producing an undesirably high level of thrust. In examples in which load controller 164 determines that the communication is lost, load controller 164 may be configured to operate power converter 162 in a fully autonomous mode based on the voltage magnitude on bus 120. In the fully autonomous mode, load controller 164 may operate as a cutback limit controller. Controllers 144 and 154 may be configured to operate energy resources 140 and 150 in normal operating modes with power references that are derived so that a remainder of the power is delivered to converter 162. The voltage magnitude on bus 120 may balance automatically when sufficient power is delivered by power converters 142 and 152.

In examples in which communication is lost between controllers 110 and 164, system controller 110 may be configured to cause load 160 to draw more power from bus 120 by sending commands to controllers 144 and 154 to increase the voltage set points for bus 120. Load controller 164 may be configured to implement an upper threshold level for increasing the power drawn by load 160 in response to determining that communication with system controller 110 has been lost. Thus, system controller 110 can increase the propulsion generated by load 160 by adjusting the set points used by controllers 144 and 154, which will cause an increase in the voltage magnitude on bus 120. Load controller 164 can determine whether the increased bus voltage is greater than the upper threshold level when communication has been lost and increase the power drawn by load 160 in response to determining that the bus voltage is greater than the upper threshold level.

Load controller 164 may be configured to maintain the power drawn by power converter 162 as the voltage magnitude on bus 120 increases beyond an upper threshold level. However, in examples in which load 160 is operating below a maximum rated power, load controller 164 may be configured to increase the power drawn by power converter 162 in response to determining that the voltage magnitude on bus 120 is greater than a first upper threshold level. The first upper threshold level may be less than the power rating that represents a hard cap on the operation of load 160.

System controller 110 may be configured to also cause load 160 to draw less power from bus 120 by sending commands to controllers 144 and 154 to reduce the voltage set points for bus 120. Thus, system controller 110 can decrease the propulsion generated by load 160 by decreasing the voltage magnitude on bus 120. Responsive to determining that communication is lost between controllers 110 and 164, load controller 164 may be configured to reduce the threshold level for load shedding so that controllers 110, 144, and 154 can more easily cause a reduction in thrust by load 160. For example, controllers 144 and 154 can reduce the power being supplied to bus 120 to cause a reduction in bus voltage below the reduced threshold level being implemented by load controller 164.

System controller 110 may be configured to store the previous set points sent to load controller 164 in response to determining that the communication between controllers 110 and 164 has been lost. System controller 110 can use these previous set points to determine new set points for controllers 144 and 154. System controller 110 may be configured to iteratively determine the set points for controllers 144 and 154 based on newly sensed parameters until the actual power values for power converters 142, 152, and 162 are within an acceptable range.

Additionally or alternatively, there may be no change in load controller 164 but controllers 144 and 154 may be configured to set base voltages below deadband. As one example, controllers 144 and/or 154 can change the deadband range to between 980 volts and 1,020 volts. Controller 164 may be configured to operate a cutback limit controller to automatically adjust the power level consumed by load 160. System 100 may have N+1 redundancy in source and loads, which makes autonomous operate feasible with this control strategy.

In examples in which load controller 164 is not under the UAC control framework (e.g., not configured to receive set point commands from system controller 110), load controller 164 may be configured to implement a separate reduction curve for the motor power reference versus the voltage magnitude on bus 120. Load controller 164 may be configured to implement this control strategy only in response to determining that the voltage magnitude on bus 120 is less than a threshold level. For example, the voltage magnitude on bus 120 may suddenly fall due to an imbalance in power generation and power utilization. In examples in which storage controller 154 is using a voltage deadband, storage controller 154 may be configured to cause energy storage device 150 to release power to bus 120 only in response to determining that the voltage magnitude on bus 120 is less than a threshold level.

Using default UAC, power converters 142 and 152 are under the UAC control framework, but power converter 162 is not under the UAC control framework. Load controller 164 may be configured to implement a load shed algorithm. As an example, a fault and disconnection may occur in power converter 142, while a second power source remains connected to bus 120. Before the time that the fault occurs, both of the power sources were operating at full capacity. At the time that the fault occurs, energy storage device 150 may operate in no-charge/no-discharge mode. In response to determining that the voltage magnitude on bus 120 is less than a threshold level just after the fault occurs, load controller 164 may be configured to reduce the power drawn to load 160 by power converter 162. Load controller 164 may be configured to operate a load reduction loop under the default UAC arrangement, where the load reduction loop includes a threshold level below the desired voltage magnitude on bus 120.

Although load controller 164 can properly implement this load shedding algorithm, the load shedding reduces the power drawn by load 160 using an open loop control. This operation by load controller 164 may stabilize the voltage magnitude on bus 120 at a level lower than the originally rate value, but the voltage magnitude on bus 120 may not achieve the originally rated value.

Figure 9:
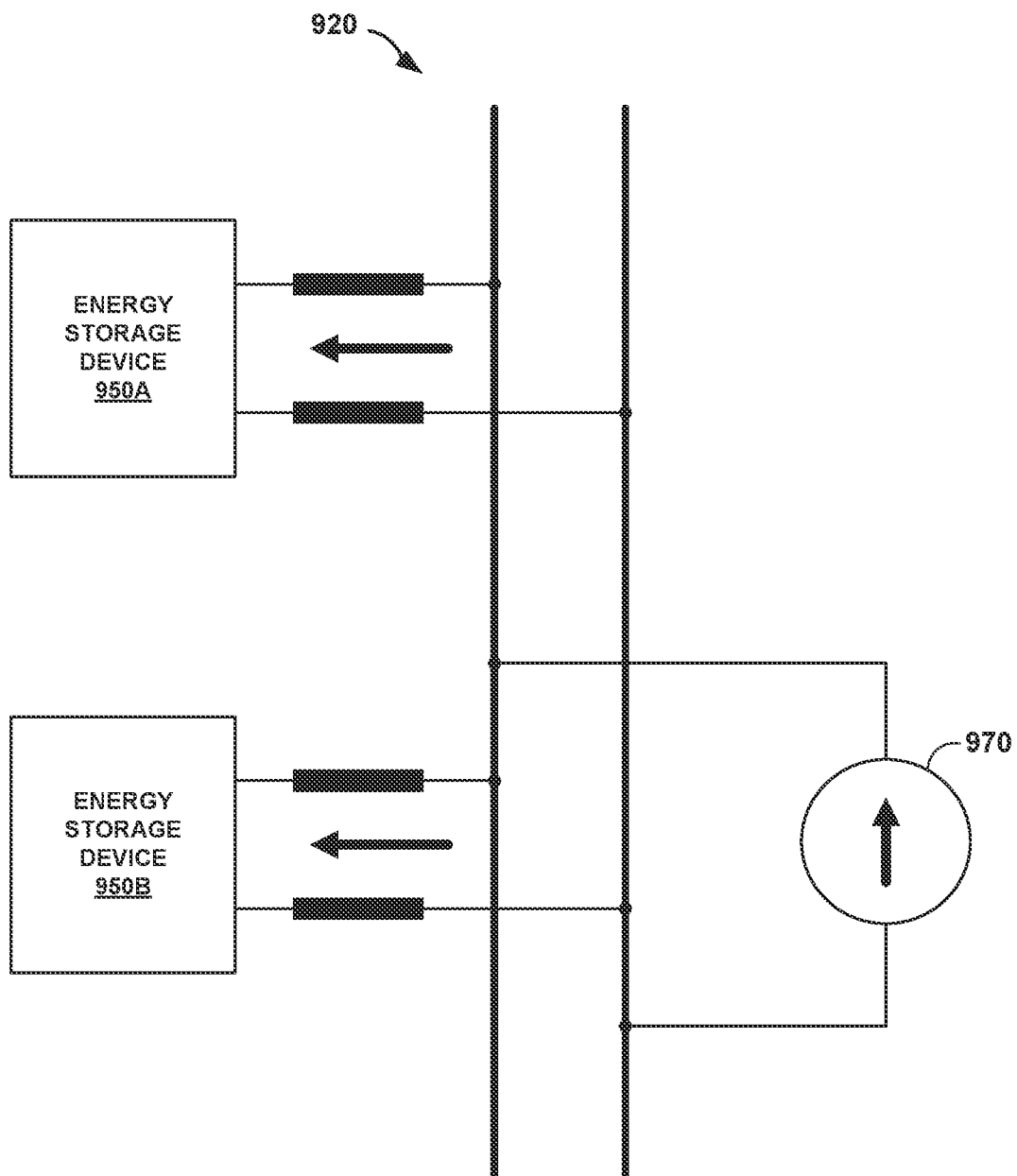
FIG. 9 is a conceptual block diagram illustrating a charging circuit for two energy storage devices, in accordance with one or more techniques of this disclosure.

FIG. 9 is a conceptual block diagram illustrating a charging circuit 970 for two energy storage devices 950A and 950B, in accordance with one or more techniques of this disclosure. Energy storage devices 950A and/or 950B may represent examples of energy storage device 150 shown in FIG. 1. When an aircraft is grounded, energy storage devices 950A and 950B can be charged using charging circuit 970. As shown in FIG. 9, charging circuit 970 can include a current source which can charge energy storage devices 950A and 950B at a certain voltage level across the terminals of energy storage devices 950A and 950B (e.g., one thousand volts). However, often when HVDC battery is fully discharged the voltage of the battery can vary over a range but much lower than battery charged voltage (e.g. 670V to 850V). Thus, the charging of energy storage devices 950A and 950B can be done using UAC.

Charging circuit 970 may be configured to charge energy storage devices 950A and 950B with a constant current. The voltage magnitude of bus 920 can be maintained at a specific level to make sure that charging circuit 970 works in order. The number of energy storage devices to be charged is represented by $N_B$, and the power flowing out of each of energy storage devices 950A and 950B can be represented as Equation (28). The no-load voltage of the droop curve is to be $V_B^*$ and droop gain of each of energy storage devices 950A and 950B can be represented by $D_B$. Equation (29) shows the droop formula for each energy storage device. Equation (30) shows the voltage set point for energy storage devices 950A and 950B to initiate the storage controllers.

$$P_{B1} = P_{B2} = -\frac{V_{HVDC} \times I_{charger}}{N_B} \quad (28)$$

$$V_{HVDC} = V_B^* - D_B \times P_B \quad (29)$$

$$V_B^* = V_{HVDC} - D_B \times \frac{V_{HVDC} \times I_{charger}}{N_B} \quad (30)$$

A storage controller implementing these control techniques may be configured to charge energy storage devices 950A and 950B of a hybrid electric propulsion system using charging circuit 970. In addition, the storage controller may be able to maintain a specific voltage magnitude on bus 920 to make charging circuit 970 function properly. Alternatively, if charging circuit 970 can be operated in constant voltage mode, ground charging can be performed in a manner that is similar to normal operation in UAC. The storage controller(s) may be configured to independently set each DC/DC converter that is connected between bus 920 and a respective one of energy storage devices 950A and 950B to a charge rate by setting the no-load voltage above a nominal voltage. In addition, charging circuit 970 can automatically provide the total power required to maintain the voltage magnitude on bus 920.

Figure 10A:
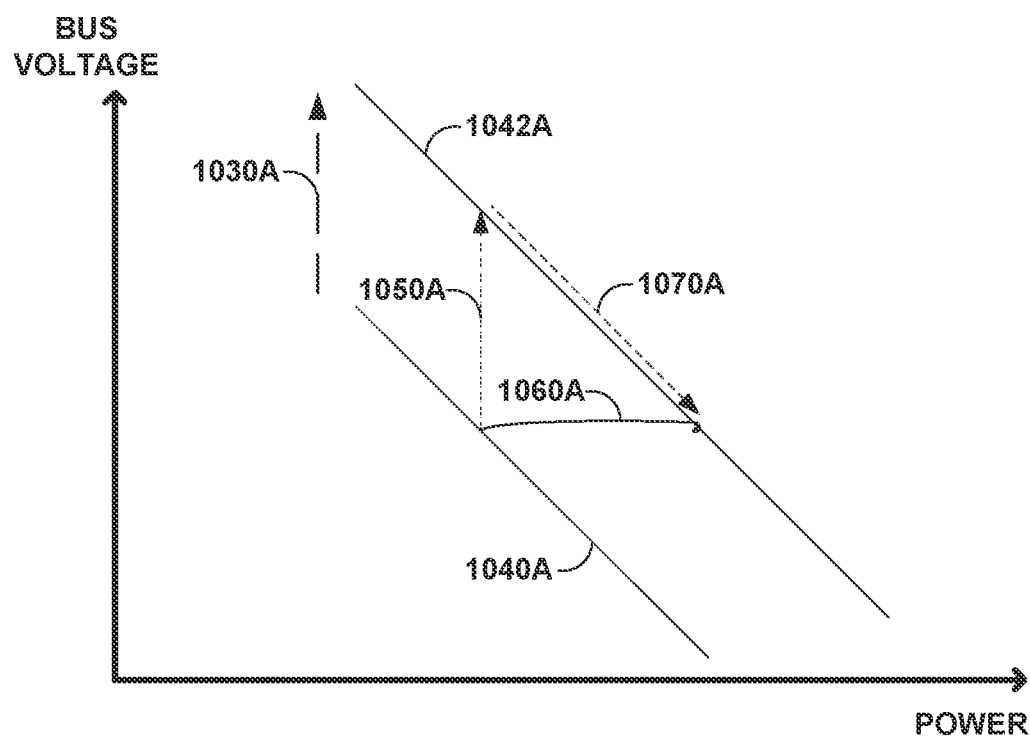
FIGS. 10A and 10B are plots illustrating a change in a set point, in accordance with one or more techniques of this disclosure.
Figure 10B:
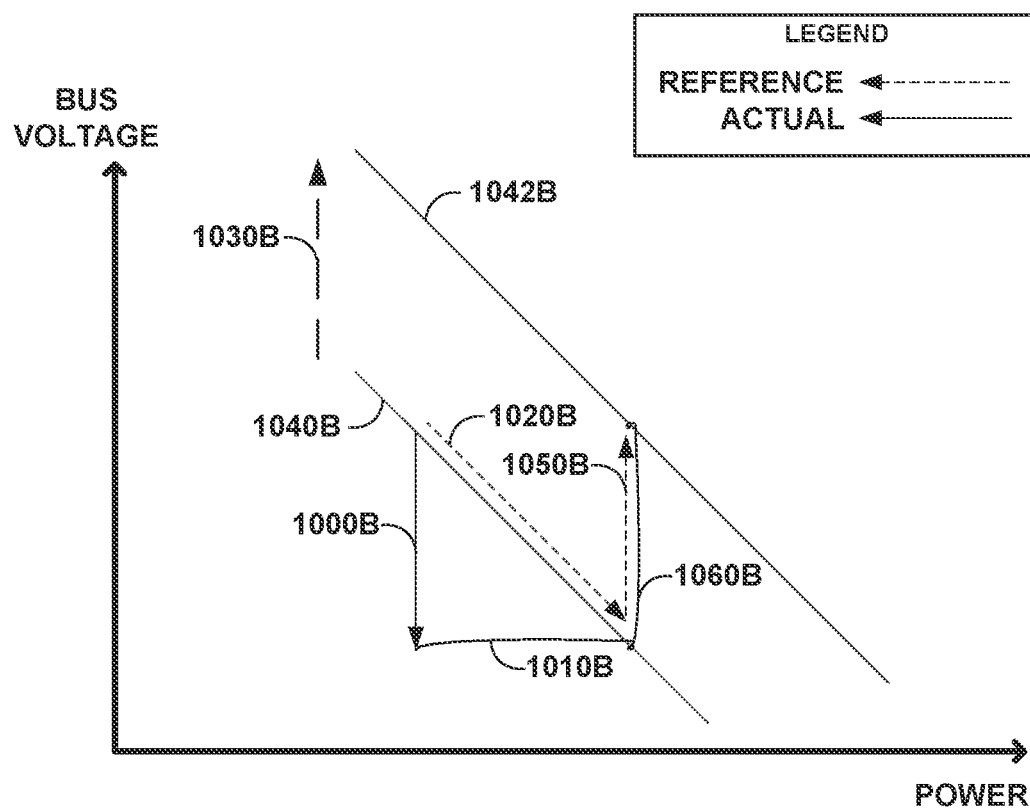

FIGS. 10A and 10B are plots illustrating a change in a set point, in accordance with one or more techniques of this disclosure. In the example shown in FIG. 10A, the system controller sends a new set point command to the primary controller (e.g., a source controller). In response to receiving the new set point command from the system controller, the primary controller causes shift 1030A from droop curve 1040A to droop curve 1042A. Shift 1030A results in increase 1050A of the reference point for the voltage magnitude on the bus. To increase the bus voltage, the primary controller increases the power generated by the power source and supplied to the bus, as shown by increase 1060A. As the power generated by the power source increases, the voltage reference point decreases down droop curve 1042B until the bus voltage and the power reach an equilibrium.

In the example shown in FIG. 10B, the bus voltage experiences decrease 1000B due to an external event, such as an increase in power consumption by a load or a reduction in power supply by a source. The primary controller may be configured to seek the voltage reference point on droop curve 1040B by increasing power, as shown by increase 1010B. As the primary controller increases power along increase 1010B, the voltage reference point decreases along line 1020B until the voltage and power reach an equilibrium. The system controller then sends a new set point command to the primary controller. In response to receiving the new set point command from the system controller, the primary controller causes shift 1030B from droop curve 1040B to droop curve 1042B. Shift 1030B results in increase 1050B of the reference set point for the voltage magnitude on the bus. To increase the bus voltage, the primary controller temporarily increases the power generated by the power source and supplied to the bus, which causes the voltage magnitude on the bus to increase, as shown by increase 1060B. Eventually, power and voltage reach an equilibrium along droop curve 1042B.

One technique for increasing the power generated by a power source is to increase the set point for the voltage magnitude on the bus. The source controller may be configured to increase the power generated and supplied to the bus in order to increase the voltage magnitude on the bus to the reference point. For each iteration, the source controller may be configured sense the current power generation by the power source, to update the voltage reference point based on the most recently sensed power generation, and to adjust the power generated by the power source to achieve the voltage reference point. For the next iteration, the source controller can update the voltage reference point based on a newly sensed power generation.

Figure 11:
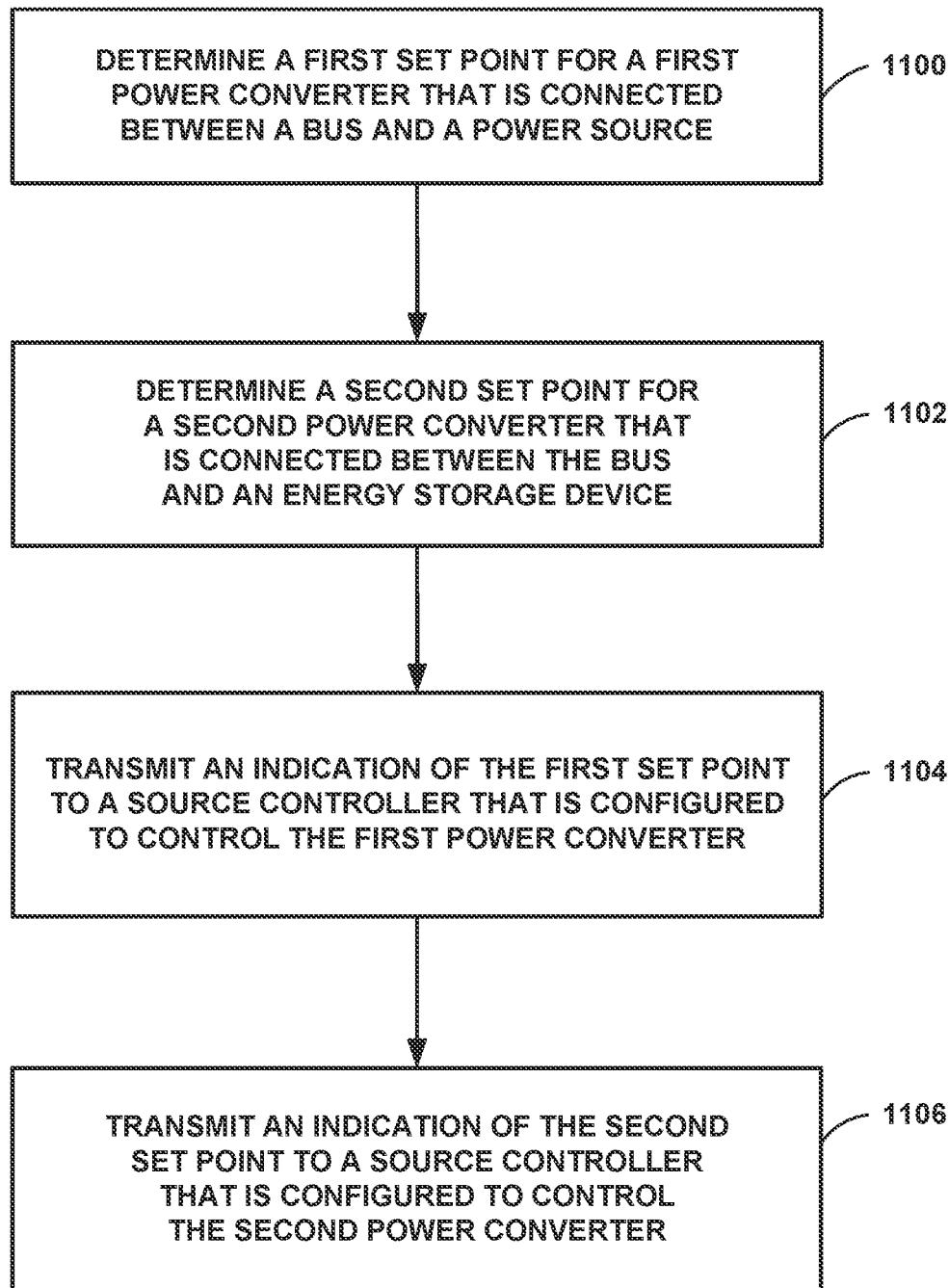
FIG. 11 is a flowchart illustrating an example process for operating a system controller, in accordance with one or more techniques of this disclosure.

FIG. 11 is a flowchart illustrating an example process for operating a system controller, in accordance with one or more techniques of this disclosure. The techniques of FIG. 11 are described with reference to system controller 110 shown in FIG. 1, but the techniques of FIG. 11 may be performed by either of system controllers 310, 810A, and 810B shown in FIGS. 3, 8A, and 8B.

In the example of FIG. 11, system controller 110 determines a first set point for power converter 142 that is connected between bus 120 and power source 140 (1100). System controller 110 may receive a sensed signal indicating the voltage magnitude on bus 120, where the voltage magnitude may represent the difference in voltages on two differential rails of bus 120. System controller 110 may determine the set point based on the voltage magnitude on bus 120, along with other parameters such as the desired propulsion to be produced by load 160 and the power drawn or produced by each of energy resources 140, 150, and 160.

In the example of FIG. 11, system controller 110 determines a second set point for power converter 152 that is connected between bus 120 and energy storage device 150 (1102). For example, system controller 110 may be configured to determine whether energy storage device 150 should operate in charging mode, discharging mode, and/or a mode without charging or discharging. System controller 110 may be configured to also determine whether energy storage device 150 should have a deadband and if so, determine the lower and upper limits of the voltage deadband.

In the example of FIG. 11, system controller 110 transmits an indication of the first set point to source controller 144 (1104). Source controller 144 may be configured to set or adjust a droop curve based on the set point received from system controller 110. For example, source controller 144 may be configured to increase the power generated by power source 140 in response to receiving a higher voltage set point for bus 120 from system controller 110. Source controller 144 may be configured to increase the power generated by power source 140 to achieve the new set point by pushing the bus voltage higher.

In the example of FIG. 11, system controller 110 transmits an indication of the second set point to storage controller 154 (1106). Storage controller 154 may be configured to set or adjust a droop curve based on the set point received from system controller 110. For example, storage controller 154 may be configured to increase change the power discharge energy storage device 150 in response to receiving a higher voltage set point for bus 120 from system controller 110. Source controller 144 may be configured to increase the power generated by power source 140 to achieve the new set point by pushing the bus voltage higher.

Figure 12:
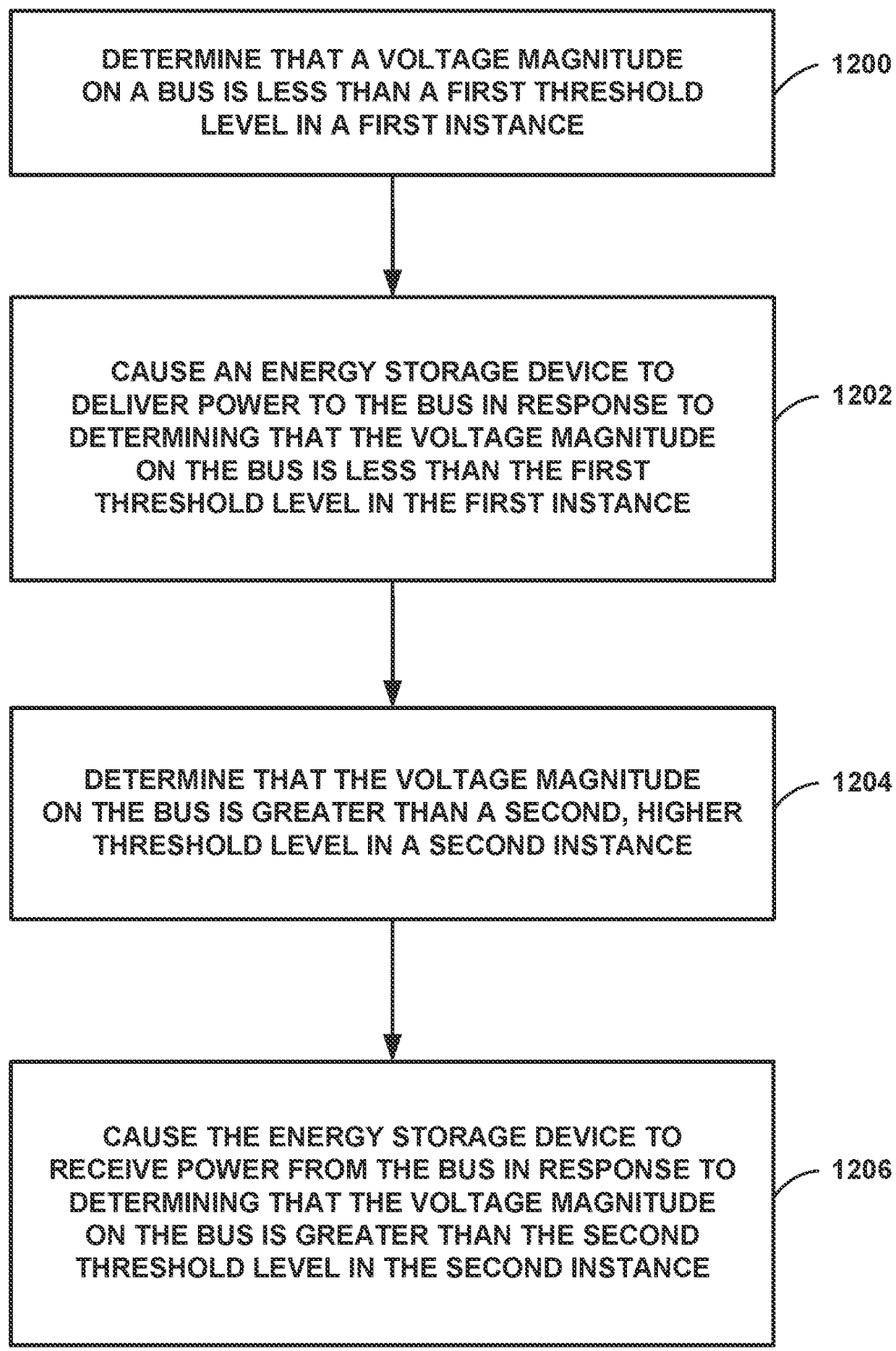
FIG. 12 is a flowchart illustrating an example process for operating a storage controller, in accordance with one or more techniques of this disclosure.

FIG. 12 is a flowchart illustrating an example process for operating a storage controller, in accordance with one or more techniques of this disclosure. In the example of FIG. 12, storage controller 154 determines that a voltage magnitude on bus 120 is less than a first threshold level in a first instance (1200). Storage controller 154 may receive a sensed signal indicating the voltage magnitude on bus 120. The first threshold level may represent the lower limit of a deadband implemented by storage controller 154. Storage controller 154 may be configured to set the first threshold level based on a command received by storage controller 154 from system controller 110.

In the example of FIG. 12, storage controller 154 causes energy storage device 150 to deliver power through power converter 152 to bus 120 in response to determining that the voltage magnitude on bus 120 is less than the first threshold level in the first instance (1202). Storage controller 154 may be configured to determine the amount of power for energy storage device 150 to deliver to bus 120 based on the voltage magnitude on bus 120 and further based on a droop curve that is stored to a memory coupled to storage controller 154. As the voltage magnitude on bus 120 decreases below the first threshold level, storage controller 154 may be configured to further increase the power delivered by energy storage device 150 to bus 120.

Storage controller 154 may be configured to determine a first magnitude of power being delivered by energy storage device 150 to bus 120 in the first instance. Storage controller 154 can determine the power being delivered by determining the current and voltage through power converter 152 and multiplying the current and voltage. Storage controller 154 may be configured to then determine a voltage reference point based on the first magnitude of power being delivered by energy storage device 150. The voltage reference point may be higher than the sensed voltage magnitude on bus 120. Storage controller 154 may be configured to also cause energy storage device 150 to deliver a second magnitude of power to bus 120 in response to determining that the voltage magnitude on bus 120 is less than the voltage reference point, wherein the second magnitude of power is greater than the first magnitude of power. Thus, storage controller 154 may increase the power output of energy storage device 150 to attain the voltage reference point for bus 120.

Storage controller 154 may be configured to determine a third magnitude of power being delivered by energy storage device 150 to bus 120 in a third instance after causing energy storage device 150 to deliver the second magnitude of power. Storage controller 154 may be configured to then determine a second voltage reference point based on the third magnitude of power being delivered by energy storage device 150. The second voltage reference point may be lower than the original reference point, especially if the third magnitude of power is greater than the first magnitude of power, because the droop curve may associate higher power magnitudes with lower reference points.

In the example of FIG. 12, storage controller 154 determines that the voltage magnitude on bus 120 is greater than the first threshold level in a second instance (1204). The second threshold level may represent the upper limit of a deadband implemented by storage controller 154. Storage controller 154 may be configured to set the second threshold level based on a command received by storage controller 154 from system controller 110.

In the example of FIG. 12, storage controller 154 causes energy storage device 150 to receive power through power converter 152 from bus 120 in response to determining that the voltage magnitude on bus 120 is greater than the first threshold level in the second instance (1206). Storage controller 154 may be configured to determine the amount of power for energy storage device 150 to receive from bus 120 based on the voltage magnitude on bus 120 and further based on a droop curve that is stored to a memory coupled to storage controller 154. As the voltage magnitude on bus 120 increases above the second threshold level, storage controller 154 may be configured to further increase the power received by energy storage device 150 from bus 120.

In response to determining that the voltage magnitude on bus 120 is between the first and second threshold levels, storage controller 154 may be configured to cause energy storage device 150 to refrain from discharging or charging. The voltage range between the first and second threshold levels is a voltage deadband, such that energy storage device 150 neither charges nor discharges when the voltage magnitude on bus 120 is in the voltage deadband. System controller 110 may be configured to set the limits of the deadband by sending commands to storage controller 154.

The extent of the storage deadband, which may be defined as the second threshold level minus the first threshold level, may be nearly as large as the operating range of power source 140. For example, the extent of the storage deadband may be at least fifty, sixty, seventy, eighty, or ninety percent of the operating range of power source 140. The extent of the storage deadband may be less than or equal to the operating range of power source 140 so that energy storage device 150 kicks in before power source 140 reaches the upper limit of an operating range. Having a storage deadband that is almost as large as the operating range of power source 140 may reduce the cycling and fatigue experienced by energy storage device 150 without any gaps where energy resources 140 and 150 cannot support the power draw of load 160.

Figure 13:
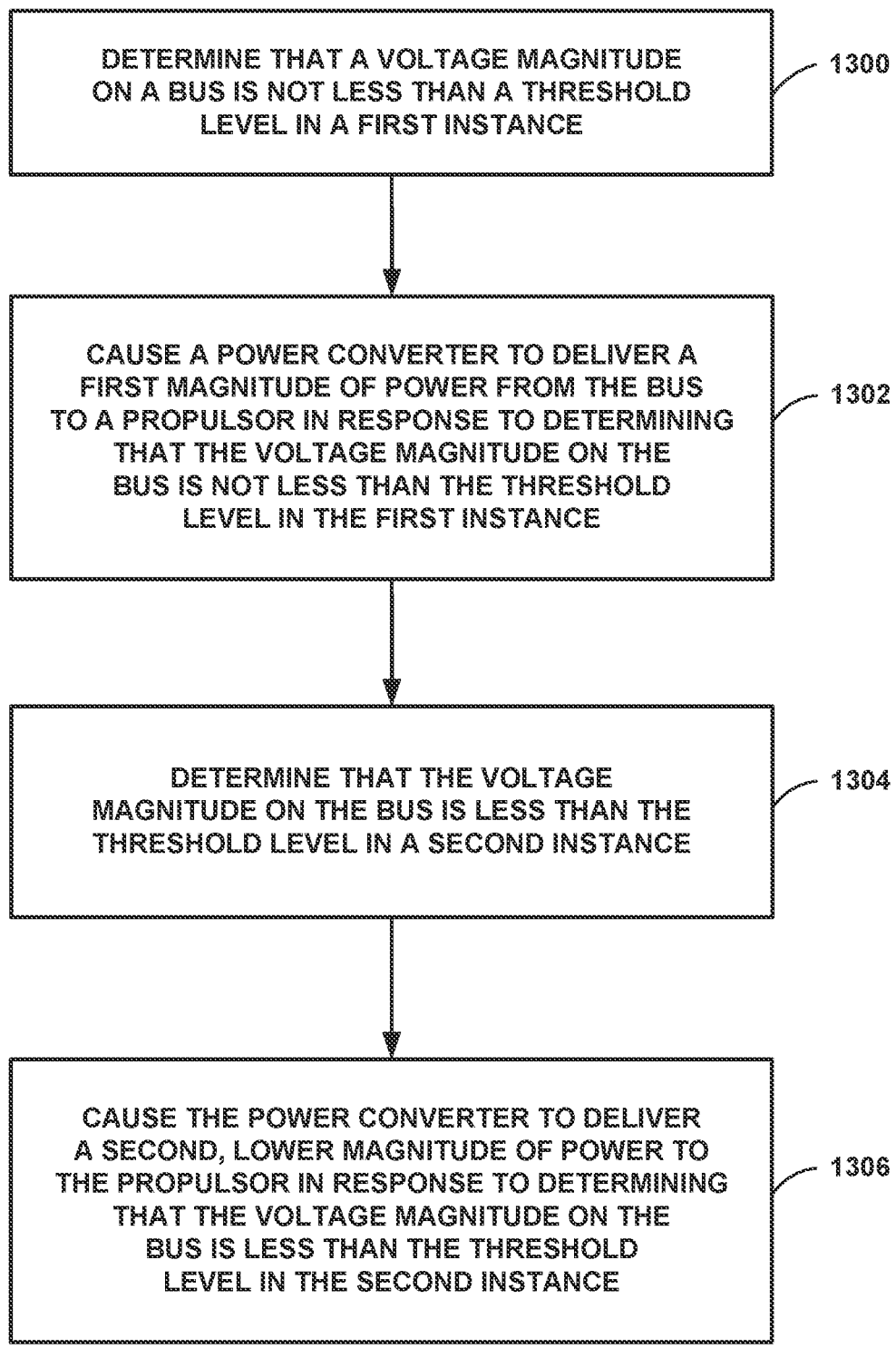
FIG. 13 is a flowchart illustrating an example process for operating a load controller, in accordance with one or more techniques of this disclosure.

FIG. 13 is a flowchart illustrating an example process for operating a load controller, in accordance with one or more techniques of this disclosure. In the example of FIG. 13, load controller 164 determines that a voltage magnitude on bus 120 is not less than a threshold level in a first instance (1300). Load controller 164 can determine the threshold level based on a command received from system controller 110. The threshold level may be a voltage magnitude below which load controller 164 reduces the power drawn by load 160.

Load controller 164 then causes power converter 162 to deliver a first magnitude of power to load 160 in response to determining that the voltage magnitude on bus 120 is not less than the threshold level in the first instance (1302). The first magnitude of power may be a default level of power based on user input or a command from system controller 110. The droop curve for bus voltages above the threshold level may be flat, such that load 160 and power converter 162 draw a constant amount of power for voltages greater than the threshold level.

In the example of FIG. 13, load controller 164 determines that the voltage magnitude on bus 120 is less than the threshold level in a second instance (1304). Load controller 164 causes power converter 162 to deliver a second magnitude of power to load 160 in response to determining that the voltage magnitude on bus 120 is less than the threshold level in the second instance (1306). The second magnitude of power is less than the first magnitude of power, which can serve to stabilize the voltage magnitude on bus 120 in the second instance. As the voltage magnitude on bus 120 decreases, load controller 164 may be configured to reduce the power drawn by power converter 162. In examples in which the voltage magnitude on bus 120 is below a lowest threshold level, load controller to reduce the power drawn by power converter 162 to zero.

Load controller 164 may be configured to determine a voltage reference point based on the magnitude of power being drawn by load 160 or by power converter 162. For example, load controller 164 may use a droop curve to determine a voltage reference point associated with the magnitude of power being drawn by load 160. Load controller may then determine whether to increase or decrease the power delivered by power converter 162 to load 160 in response to determining whether the voltage reference point is greater than or less than the current voltage magnitude on bus 120. Responsive to determining that the current voltage magnitude on bus 120 is less than the voltage reference point, load controller 164 may be configured to cause power converter 162 to reduce the power being delivered to load 160 to raise the bus voltage to the voltage reference point. As used herein, a set point may refer to a threshold level at the edge of a deadband, and a reference point may refer to a point on a droop curve that is outside of the deadband.

Load controller 164 may be configured to perform load shedding by enabling a droop curve to reduce the power drawn by load 160 as the voltage magnitude on bus 120 decreases. Each reduction in bus voltage can result in a lowered power draw by power converter 162 and load 160. In examples in which the voltage magnitude on bus 120 drops below a threshold level, load controller 164 may be configured to disconnect load 160 from bus 120. Load controller 164 may be configured to also receive an updated command from system controller 110 to increase or reduce the threshold level for load shedding. Responsive to determining that the voltage magnitude on bus 120 is less than the new threshold level, load controller 164 may be configured to cause power converter 162 to reduce the power being delivered to load 160 from the magnitude of power that was being delivered to load 160 before the arrival of the updated command from system controller 110.

Load shedding (e.g., decreasing the power drawn by load 160) may increase the voltage magnitude on bus 120. In examples in which system 100 includes two propulsors, an operator may provide an input for reduced propulsion from a first propulsor. System controller 110 may be configured to transmit an indication of an increased voltage reference point to load controller 164, which may cause load controller 164 to reduce the power drawn by a motor driving the first propulsor.

The reduced power draw may result in an increased voltage magnitude on bus 120. If a second load controller is configured to operate the second propulsor on a droop curve, the second load controller may be configured to increase the power drawn by the second propulsor in response to sensing the increased voltage magnitude on bus 120. This situation may result in an uncommanded increase in thrust from the second propulsor after the operator commands a reduction in thrust from the first propulsor. To avoid an uncommanded increase in thrust on the high end of bus voltages, load controller 164 may be configured to implement a deadband.

By implementing the deadband, load controller 164 may not cause an increase in the power drawn by power converter 162 and load 160 when the voltage magnitude on bus 120 increases above a certain voltage level. However, on the low end of voltage magnitudes for bus 120, load controller 164 may be configured to reduce the power drawn by load 160 to reduce the likelihood that the voltage magnitude on bus 120 collapses.

In normal operation, system controller 110 may be configured to control the operation of load controller 164 by transmitting set point commands to load controller 164. Responsive to receiving a set point command from system controller 110, load controller 164 may be configured to enable droop control. Responsive to determining that a set point command has not been received from system controller 110 for a particular time duration, load controller 164 may be configured to disable droop control. Even in examples in which communication is lost between controllers 110 and 164, system controller 110 may be able to control the operation of load controller 164 by controlling the voltage magnitude on bus 120 through controllers 144 and 154.

Thus, responsive to determining that communication has been lost with system controller 110, load controller 164 may be configured to enable droop control to allow for system controller 110 to issue thrust commands via the voltage magnitude on bus 120. Responsive to determining that communication with system controller 110 has been lost, load controller 164 may be configured to implement an upper threshold level for the voltage magnitude on bus 120 above which load controller 164 will increase the power drawn by load 160. Between the upper and lower threshold levels, load controller 164 may be configured to refrain from increasing or decreasing the power drawn by load 160 in response to changes in the voltage magnitude on bus 120.

Both of controllers 110 and 164 may store data indicating the droop curve(s) to be implemented by load controller 164, so even after communication loss, system controller 110 can effectively cause an increase or reduction in thrust by increasing or decreasing the voltage magnitude on bus 120. For example, in response to determining a loss in communication, load controller 164 may be configured to implement the last droop curve transmitted by system controller 110 before the loss in communication and/or to implement a default droop curve stored in local memory.

Figure 14:
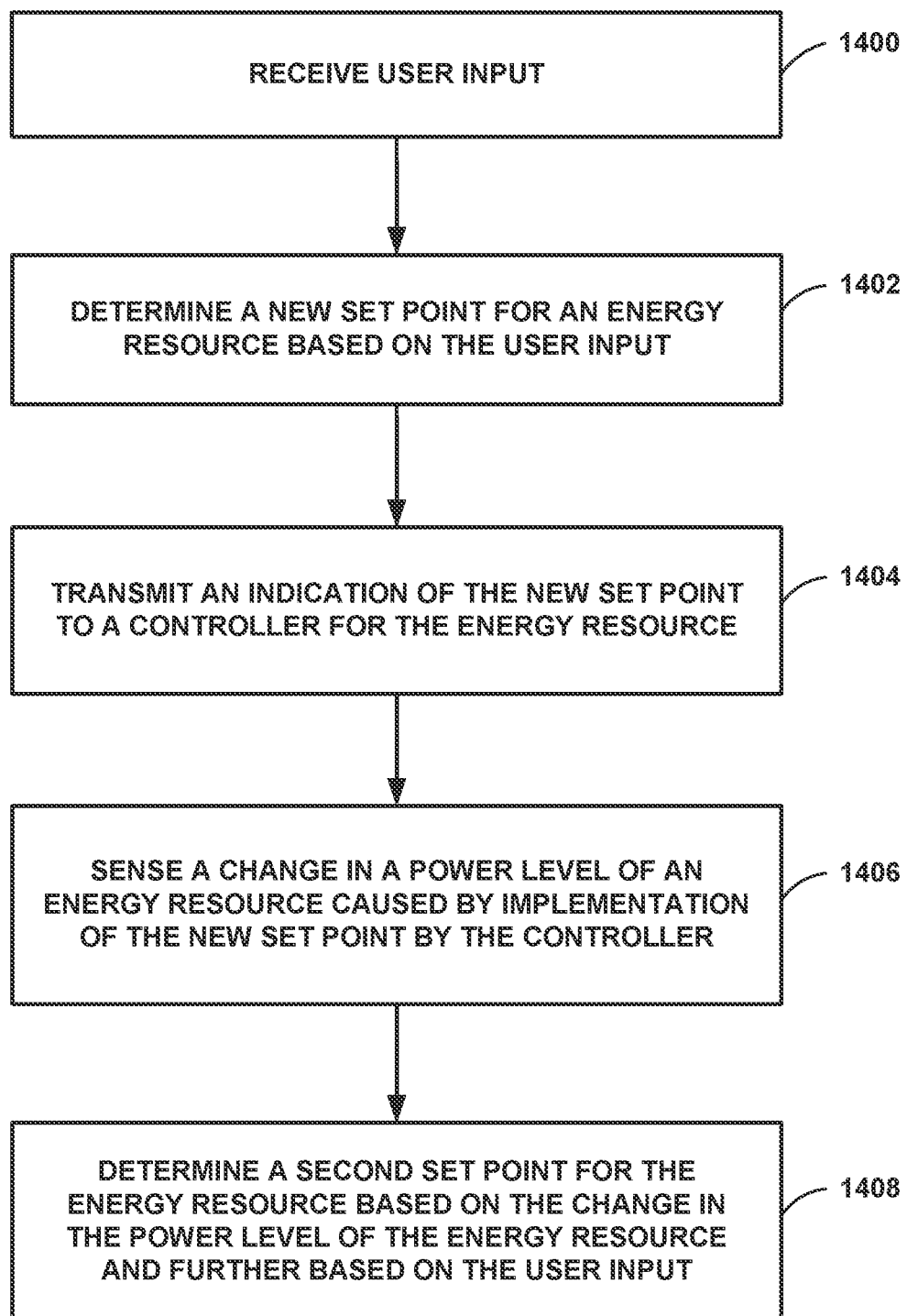
FIG. 14 is a flowchart illustrating an example process for operating a system controller based on user input, in accordance with one or more techniques of this disclosure.

FIG. 14 is a flowchart illustrating an example process for operating a system controller based on user input, in accordance with one or more techniques of this disclosure. In the example of FIG. 14, system controller 110 receives user input from an operator of system 100 (1400). For example, the operator can adjust the throttle setting in the cockpit of an aircraft, and the avionics system will then transmit an indication of this adjustment to system controller 110. The operator may also be able to adjust the share of power that comes from energy storage device 150. System controller 110 can receive an indication of this request by the user for increased or reduced propulsion in system 100. Thus, the user input received by system controller 110 may indicate that the user has changed a setting or parameter controlled by the user.

System controller 110 then determines a new set point for one of energy resources 140, 150, and 160 based on the user input (1402). The set point may include a target value for the voltage magnitude on bus 120, an upper deadband threshold level, and/or a low deadband threshold level. Additionally or alternatively, the set point be a torque set point for load 160. In the example of FIG. 14, system controller 110 transmits an indication of the new set point to one of controllers 144, 154, and 164 (1404). System 100 may include a wired communication line and/or a wireless communication channel between system controller 110 and each of controllers 144, 154, and 164 for sending set point commands.

In the example of FIG. 14, system controller 110 senses a change in a power level of an energy resource caused by the respective one of controllers 144, 154, and 164 implementing the new set point (1406). System controller 110 may be configured to determine that a change in power level has occurred by determining the power conducted by one of power converters 142, 152, and 162 before and after implementing the new set point.

A primary controller can cause a change in power level by increasing or decreasing the power received from bus 120 or delivered to bus 120. System controller 110 then determines a second set point for the respective energy resource based on the change in the power level of the energy resource and further based on the user input (1408). The second set point may essentially reset the droop slopes implemented by controllers 144, 154, and 164. In determining the second set point, system controller 110 may be configured to account for the change in voltage magnitude on bus 120 after the primary controller implemented the first set point. System controller 110 may be configured to transmit the second set point to load controller 164 in response to determining that the voltage magnitude on bus 120 has not reached a steady state value. System controller 110 may be configured to then wait for another input from the user after transmitting the second set point to load controller 164.

One of controllers 110, 144, 154, and 164 may be configured to determine whether the rate of change of a set point is greater than or equal to a threshold rate. In response to determining that the rate of change is greater than or equal to the threshold rate, the controller may be configured to shrink a deadband to zero and wait for the voltage magnitude on bus 120 to achieve an equilibrium level. In response to determining that the voltage magnitude on bus 120 has achieved an equilibrium level, the controller may add a deadband to the droop control.

The following numbered examples demonstrate one or more aspects of the disclosure.

Example 1. A method includes determining, by a system controller, a first set point for a first power converter connected to a bus, where the first power converter has a first topology. The method also includes transmitting, by the system controller, an indication of the first set point to a source controller, where the source controller is configured to control the first power converter. The method further includes determining, by the system controller, a second set point for a second power converter connected to the bus, where the second power converter has a second topology, and the first topology being different from the second topology. The method includes transmitting, by the system controller, an indication of the second set point to a storage controller, where the storage controller is configured to control the second power converter.

Example 2. The method of example 1, further including determining a third set point for a third power converter connected between a load and the bus.

Example 3. The method of example 2, where a topology of the third power converter is different from the second topology.

Example 4. The method of the preceding examples or any combination thereof, further including transmitting an indication of a third set point to a load controller.

Example 5. The method of the preceding examples or any combination thereof, further including receiving an indication that a user has requested a change in propulsion.

Example 6. The method of the preceding examples or any combination thereof, further including transmitting a set point to a load controller in response to receiving the indication that the user has requested the change in the propulsion.

Example 7. The method of the preceding examples or any combination thereof, further including transmitting a second voltage command to the load controller indicating a new value for the threshold level in response to determine that the voltage magnitude on the bus has not reached the steady state.

Example 8. A method includes determining, by a storage controller, that a voltage magnitude on a bus is less than a first threshold level in a first instance. The method also includes causing, by the storage controller, an energy storage device to deliver power to the bus in response to determining that the voltage magnitude on the bus is less than the first threshold level. The method further includes determining, by the storage controller, that the voltage magnitude on the bus is greater than a second threshold level in a second instance, where the second threshold level is greater than the first threshold level. The method includes causing, by the storage controller, the energy storage device to receive power from the bus in response to determining that the voltage magnitude on the bus is greater than the second threshold level.

Example 9. The method of example 8, further including causing the energy storage device to refrain from discharging or charging in response to determining that the voltage magnitude on the bus is within a voltage deadband defined between the first threshold level and the second threshold level.

Example 10. The method of example 9, where an extent of the voltage deadband is greater than fifty, sixty, seventy, or eighty percent of an operating range of the power source.

Example 11. The method of example 9 or example 10, where the extent of the voltage deadband is less than or equal to the operating range of the power source.

Example 12. The method of examples 8-11 or any combination thereof, further including receiving a voltage command from a system controller.

Example 13. The method of examples 8-12 or any combination thereof, set the first threshold level based on a voltage command received from a system controller.

Example 14. The method of examples 8-13 or any combination thereof, further including setting a droop curve for discharge of the energy storage device based on a voltage command received from a system controller.

Example 15. The method of examples 8-14 or any combination thereof, further including setting the second threshold level based on a voltage command received from a system controller.

Example 16. The method of examples 8-15 or any combination thereof, further including determining a first magnitude of power being delivered by the energy storage device to the bus in the first instance.

Example 17. The method of examples 8-16 or any combination thereof, further including determining a voltage reference point based on the first magnitude of power being delivered by the energy storage device.

Example 18. The method of examples 8-17 or any combination thereof, further including causing the energy storage device to deliver a second magnitude of power to the bus in response to determining that the voltage magnitude on the bus is less than a voltage reference point, where the second magnitude of power is greater than a first magnitude of power previously delivered by the energy storage device.

Example 19. The method of examples 8-18 or any combination thereof, further including determining a third magnitude of power being delivered by the energy storage device to the bus in a third instance after the first instance.

Example 20. The method of examples 8-19 or any combination thereof, further including determining a second voltage reference point based on the third magnitude of power being delivered by the energy storage device, where the second voltage reference point is different from the first voltage reference point.

Example 21. The method of examples 8-20 or any combination thereof, further including determining a fault on a low-voltage energy storage device.

Example 22. The method of examples 8-21 or any combination thereof, further including controlling the second power converter to deliver power from the first energy storage device to the storage controller in response to determining the fault on the second energy storage device.

Example 23. A method includes determining, by a load controller, that a voltage magnitude on a bus is not less than a threshold level in a first instance. The method also includes causing, by a load controller, a power converter to deliver a first magnitude of power to the load in response to determining that the voltage magnitude on the bus is not less than the threshold level in the first instance. The method further includes determining that the voltage magnitude on the bus is less than the threshold level in a second instance. The method includes causing the power converter to deliver a second magnitude of power to the load in response to determining that the voltage magnitude on the bus is less than the threshold level in the second instance, the second magnitude of power being less than the first magnitude of power.

Example 24. The method of example 23, further including receiving a first voltage command from a system controller.

Example 25. The method of example 23 or example 24, further including setting the threshold level based on a first voltage command received from a system controller.

Example 26. The method of examples 23-25 or any combination thereof, further including determining a fault on a communication line between the load controller and a system controller.

Example 27. The method of examples 23-26 or any combination thereof, further including controlling the power converter to operate in an autonomous mode in response to determining a fault on a communication line between the load controller and a system controller.

Example 28. The method of examples 23-27 or any combination thereof, further including reducing a value of the threshold level in response to determining a fault on a communication line between the load controller and a system controller.

Example 29. The method of examples 23-28 or any combination thereof, further including implementing a second threshold level in response to determining a fault on a communication line between the load controller and a system controller, where the second threshold level is greater than the first threshold level.

Example 30. The method of examples 23-29 or any combination thereof, further including determining that the voltage magnitude on the bus is greater than the second threshold level in a third instance.

Example 31. The method of examples 23-30 or any combination thereof, further including causing the power converter to deliver a third magnitude of power to the load in response to determining that the voltage magnitude on the bus is greater than the second threshold level in the third instance, where the third magnitude of power is greater than the first magnitude of power.

Example 32. The method of examples 23-31 or any combination thereof, further including setting the threshold level to a first value based on the first voltage command; receiving a second voltage command from the system controller; and setting the threshold level to a second value based on the second voltage command, where the second value is greater than the first value.

Example 33. The method of examples 23-32 or any combination thereof, further including causing the power converter to deliver a third magnitude of power to the load in response to setting the threshold level to the second value, where the third magnitude of power is less than the second magnitude of power.

Example 34. The method of examples 23-33 or any combination thereof, further including determining a voltage reference point based on the second magnitude of power being delivered to the load in the second instance; and causing the power converter to deliver a third magnitude of power to the load in response to determining that the voltage magnitude on the bus is less than the voltage reference point, where the third magnitude of power is less than the second magnitude of power.

Example 35. The method of examples 23-34 or any combination thereof, further including receiving at least one sensed signal indicating a current through the load or a voltage across the load.

Example 36. The method of examples 23-35 or any combination thereof, further including determining a magnitude of power being delivered to the load based on at least one sensed signal.

Example 37. The method of examples 23-36 or any combination thereof, further including operating a current loop to generate control signals for the power converter.

Example 38. The method of examples 23-37 or any combination thereof, where the power converter includes an inverter configured to convert direct-current electricity on the bus to alternating-current electricity to drive a motor.

Example 39. A device includes a computer-readable medium having executable instructions stored thereon, configured to be executable by processing circuitry for causing the processing circuitry to perform the method of examples 1-38 or any combination thereof.

Example 40. A system including means for performing each of the method steps of examples 1-38 or any combination thereof.

Example 41. A system including a bus and a first power converter connected to the bus. The system also includes a second power converter connected to the bus, the second power converter having a topology different from the topology of the first power converter. The system further includes a power source and an energy storage device connected to the bus via the first and second power converters, respectively. In addition, the system includes a source controller configured to control the first power converter and a storage controller configured to control the second power converter. The system also includes a system controller configured to determine a first set point for the first power converter, transmit an indication of the first set point to the source controller, determine a second set point for the second power converter, and transmit an indication of the second set point to the storage controller.

Example 42. The system of example 41, where the system controller is configured to perform each of the method steps of examples 1-7 or any combination thereof.

Example 43. The system of example 41 or example 42, further including a third power converter, a load configured to receive power from the bus via the third power converter, and a load controller configured to control the third power converter.

Example 44. The system of examples 41-43 or any combination thereof, where a third power converter connected between the bus and a load includes a third topology, the second topology being different from the third topology.

Example 45. The system of examples 41-44 or any combination thereof, where a load connected to the bus via a power converter includes a propulsor.

Example 46. The system of examples 41-45 or any combination thereof, further including a motor configured to drive a propulsor based on power received from the bus via a third power converter.

Example 47. The system of examples 41-46 or any combination thereof, further including an inverter configured to convert direct-current electricity on the bus to alternating-current electricity to drive a motor.

Example 48. The system of examples 41-47 or any combination thereof, where the power source includes a generator that is coaxial with an engine shaft.

Example 49. The system of examples 41-48 or any combination thereof, where the first power converter includes a rectifier.

Example 50. The system of examples 41-49 or any combination thereof, where the second power converter includes a direct current/direct current converter.

Example 51. The system of examples 41-50 or any combination thereof, further including a second energy storage device connected to the power converter, where the energy storage device is configured to provide power to the auxiliary load.

Example 52. A system includes an energy storage device configured to deliver power to a bus or receive power from a bus via a power converter. The system also includes a controller configured to determine that a voltage magnitude on the bus is less than a first threshold level in a first instance and cause the energy storage device to deliver power to the bus in response to determining that the voltage magnitude on the bus is less than the first threshold level. The controller is also configured to determine that the voltage magnitude on the bus is greater than a second threshold level in the second instance, where the second threshold level is greater than a first threshold level and cause the energy storage device to receive power from the bus in response to determining that the voltage magnitude on the bus is greater than the second threshold level.

Example 53. The system of examples 41-52 or any combination thereof, further including a load controller configured to perform each of the method steps of examples 23-38 or any combination thereof.

Example 54. The system of examples 41-53 or any combination thereof, where an extent of a voltage deadband of the energy storage device is greater than sixty percent of an operating range of a power source in the system.

Example 55. The system of examples 41-54 or any combination thereof, where the extent of a voltage deadband of the energy storage device is less than or equal to the operating range of a power source in the system.

Example 56. The system of examples 41-55 or any combination thereof, where the energy storage device includes a high-voltage energy storage device connected to the bus via a high-voltage power converter.

Example 57. The system of examples 41-56 or any combination thereof, further including a low-voltage power converter connected to the high-voltage energy storage device.

Example 58. The system of examples 41-57 or any combination thereof, further including a low-voltage energy storage device connected to the bus through a low-voltage power converter and a high-voltage power converter.

Example 59. The system of examples 41-58 or any combination thereof, further including one or more conductors connected between the high-voltage energy storage device and the high-voltage power converter, where the low-voltage power converter is connected to the one or more conductors.

Example 60. The system of examples 41-59 or any combination thereof, where the second power converter includes a buck converter configured to generate a stepped-down voltage signal based on electricity received from the one or more conductors.

Example 61. The system of examples 41-60 or any combination thereof, where the second energy storage device is configured to receive the stepped-down voltage signal from the second power converter.

Example 62. The system of examples 41-61 or any combination thereof, where the second power converter is not directly connected to the bus.

Example 63. The system of examples 41-62 or any combination thereof, where the low-voltage energy storage device is configured to deliver power to the bus via the second power converter and via the first power converter in a third instance.

Example 64. The system of examples 41-63 or any combination thereof, where the low-voltage energy storage device is configured to receive power from the bus via the first power converter and via the second power converter in a fourth instance.

Example 65. The system of examples 41-64 or any combination thereof, where a voltage across terminals of the second energy storage device is less than a no-load voltage level of the first energy storage device.

Example 66. The system of examples 41-65 or any combination thereof, where the second energy storage device is configured to supply power to the storage controller.

Example 67. The system of examples 41-66 or any combination thereof, where the storage controller is configured to control the low-voltage power converter to deliver power from the high-voltage energy storage device to the storage controller in response to determining the fault on the low-voltage energy storage device.

Example 68. The system of examples 41-67 or any combination thereof, further including a charging port connected to the bus, where the bus is configured to receive power from the charging port when a power source and a load are not operating.

Example 69. A system includes a load configured to generate propulsion based on power received from a bus via a power converter. The system also includes a controller configured to determine that a voltage magnitude on the bus is not less than a threshold level in a first instance and cause the power converter to deliver a first magnitude of power to the load in response to determining that the voltage magnitude on the bus is not less than the threshold level in the first instance. The controller is also configured to determine that the voltage magnitude on the bus is less than the threshold level in a second instance and cause the power converter to deliver a second magnitude of power to the load in response to determining that the voltage magnitude on the bus is less than the threshold level in the second instance, the second magnitude being less than the first magnitude.

Example 70. The system of examples 41-69 or any combination thereof, where the storage controller is configured to perform each of the method steps of examples 8-22 or any combination thereof.

Various examples have been described. Any combination of the described systems, operations, or functions is contemplated. These and other examples are within the scope of the following claims.

What is claimed is:

1. An aircraft comprising:
    a bus;
    a power converter connected to the bus;
    a power source configured to deliver power to the bus;
    an energy storage device configured to:
        deliver power to the bus via the power converter in a first instance; and receive power from the bus via the power converter in a second instance; and a controller configured to:
- determine that a voltage magnitude on the bus is less than a first threshold level in the first instance;
- cause the energy storage device to deliver power to the bus in response to determining that the voltage magnitude on the bus is less than the first threshold level;
- determine that the voltage magnitude on the bus is greater than a second threshold level in the second instance, wherein the second threshold level is greater than the first threshold level;
- cause the energy storage device to receive power from the bus in response to determining that the voltage magnitude on the bus is greater than the second threshold level; and
- cause the energy storage device to refrain from discharging or charging in response to determining that the voltage magnitude on the bus is within a voltage deadband defined between the first threshold level and the second threshold level, wherein:
  - an extent of the voltage deadband is greater than sixty percent of an operating range of the power source, and
  - the extent of the voltage deadband is less than or equal to the operating range of the power source.

2. The aircraft of claim 1, wherein the controller is a storage controller, the system further comprising a system controller, wherein the storage controller is configured to:
- receive a first voltage command from the system controller; and
- set the first threshold level based on the first voltage command.

3. The aircraft of claim claim 2, wherein the storage controller is configured to set a droop curve for discharge of the energy storage device based on the first voltage command.

4. The aircraft of claim claim 2, wherein the storage controller is configured to:
- receive a second voltage command from the system controller; and
- set the second threshold level based on the second voltage command.

5. The aircraft of claim 1, wherein the controller is configured to:
- determine a first magnitude of power being delivered by the energy storage device to the bus in the first instance;
- determine a voltage reference point based on the first magnitude of power being delivered by the energy storage device; and
- cause the energy storage device to deliver a second magnitude of power to the bus in response to determining that the voltage magnitude on the bus is less than the voltage reference point, wherein the second magnitude of power is greater than the first magnitude of power.

6. The aircraft of claim claim 5, wherein the voltage reference point is a first voltage reference point, and wherein the controller is configured to:
- determine a third magnitude of power being delivered by the energy storage device to the bus in a third instance after the first instance; and
- determine a second voltage reference point based on the third magnitude of power being delivered by the energy storage device, wherein the second voltage reference point is different from the first voltage reference point.

7. The aircraft of claim 1, wherein the energy storage device is a first energy storage device, wherein the power converter is a first power converter, the system further comprising:
- a second power converter connected to the first power converter and connected to the first energy storage device; and
- a second energy storage device connected to the second power converter.

8. The aircraft of claim claim 7, further comprising one or more conductors connected between the first energy storage device and the first power converter,
- wherein the second power converter is connected to the one or more conductors.

9. The aircraft of claim claim 8,
- wherein the second power converter comprises a buck converter configured to generate a stepped-down voltage signal based on electricity received from the one or more conductors, and
- wherein the second energy storage device is configured to receive the stepped-down voltage signal from the second power converter.

10. The aircraft of claim claim 7, wherein the second power converter is not directly connected to the bus.

11. The aircraft of claim claim 7, wherein the second energy storage device is configured to:
- deliver power to the bus via the second power converter and via the first power converter in a third instance; and
- receive power from the bus via the first power converter and via the second power converter in a fourth instance.

12. The aircraft of claim claim 7, wherein a voltage across terminals of the second energy storage device is less than a no-load voltage level of the first energy storage device.

13. The aircraft of claim claim 7, wherein the second energy storage device is configured to supply power to the storage controller.

14. The aircraft of claim claim 13, wherein the storage controller is configured to:
- determine a fault on the second energy storage device; and
- control the second power converter to deliver power from the first energy storage device to the storage controller in response to determining the fault on the second energy storage device.

15. The aircraft of claim 1, further comprising:
- a load configured to receive power from the bus; and
- a charging port connected to the bus,
- wherein the bus is configured to receive power from the charging port when the power source and the load are not operating.

16. The aircraft of claim 1, further comprising:
- an electric motor configured to:
  - receive power from the bus; and
  - operate a propulsor of the aircraft using the power received from the bus.

17. The aircraft of claim 1, wherein the power source comprises a gas turbine engine one or more generators.

18. The aircraft of claim 1, wherein the controller is configured to control operation of the energy storage device based on a current phase of flight of the aircraft, wherein the current phase of flight comprises one of in-flight, take-off, landing, and cruise.

19. A method for controlling an energy storage device connected to a bus of an aircraft, the method comprising:
- delivering, by a power source, power to the bus;
- determining, by a storage controller, that a voltage magnitude on the bus is less than a first threshold level in a first instance;

causing, by the storage controller, the energy storage device to deliver power to the bus in response to determining that the voltage magnitude on the bus is less than the first threshold level;

determining, by the storage controller, that the voltage magnitude on the bus is greater than a second threshold level in a second instance, wherein the second threshold level is greater than the first threshold level;

causing, by the storage controller, the energy storage device to receive power from the bus in response to determining that the voltage magnitude on the bus is greater than the second threshold level; and causing the energy storage device to refrain from discharging or charging in response to determining that the voltage magnitude on the bus is within a voltage deadband defined between the first threshold level and the second threshold level, wherein:
- an extent of the voltage deadband is greater than sixty percent of an operating range of the power source, and
- the extent of the voltage deadband is less than or equal to the operating range of the power source.

20. A device comprising a non-transitory computer-readable medium having executable instructions stored thereon, configured to be executable by processing circuitry for causing the processing circuitry to:

cause a power source of an aircraft to deliver power to a bus of the aircraft determine that a voltage magnitude on the bus is less than a first threshold level in a first instance;

cause an energy storage device to deliver power to the bus in response to determining that the voltage magnitude on the bus is less than the first threshold level;

determine that the voltage magnitude on the bus is greater than a second threshold level in a second instance, wherein the second threshold level is greater than the first threshold level;

cause the energy storage device to receive power from the bus in response to determining that the voltage magnitude on the bus is greater than the second threshold level; and cause the energy storage device to refrain from discharging or charging in response to determining that the voltage magnitude on the bus is within a voltage deadband defined between the first threshold level and the second threshold level, wherein:
- an extent of the voltage deadband is greater than sixty percent of an operating range of the power source, and
- the extent of the voltage deadband is less than or equal to the operating range of the power source.

* * * * *